United States Patent
Li et al.

(10) Patent No.: US 10,567,426 B2
(45) Date of Patent: *Feb. 18, 2020

(54) METHODS AND APPARATUS FOR DETECTING AND/OR DEALING WITH DENIAL OF SERVICE ATTACKS

(71) Applicant: Ribbon Communications Operating Company, Inc., Westford, MA (US)

(72) Inventors: Shiping Li, Acton, MA (US); Toru Mike Yamanishi, Pepperell, MA (US); Kevin Pilotte, Londonderry, NH (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 206 days.

This patent is subject to a terminal disclaimer.

(21) Appl. No.: 15/835,392

(22) Filed: Dec. 7, 2017

(65) Prior Publication Data
US 2018/0103060 A1 Apr. 12, 2018

Related U.S. Application Data

(63) Continuation of application No. 14/336,622, filed on Jul. 21, 2014, now Pat. No. 9,888,033.

(60) Provisional application No. 62/014,683, filed on Jun. 19, 2014.

(51) Int. Cl.
*H04L 29/06* (2006.01)
*H04L 12/813* (2013.01)
*H04L 12/801* (2013.01)
*H04L 12/851* (2013.01)

(52) U.S. Cl.
CPC .......... *H04L 63/1458* (2013.01); *H04L 47/10* (2013.01); *H04L 47/11* (2013.01); *H04L 47/20* (2013.01); *H04L 47/24* (2013.01); *H04L 47/2441* (2013.01); *H04L 69/22* (2013.01)

(58) Field of Classification Search
CPC ..... H04L 63/1458; H04L 47/10; H04L 47/11; H04L 47/02; H04L 47/24; H04L 47/2441; H04L 69/22
See application file for complete search history.

(56) References Cited

U.S. PATENT DOCUMENTS

| 7,139,679 | B1 * | 11/2006 | McGrew | H04L 63/1458 702/186 |
| 7,215,637 | B1 * | 5/2007 | Ferguson | H04L 45/00 370/230.1 |
| 9,888,033 | B1 * | 2/2018 | Li | H04L 63/1458 |
| 2004/0230839 | A1 * | 11/2004 | Cohen | H04L 47/10 726/22 |

(Continued)

OTHER PUBLICATIONS

Jin, "Hop-Count Filtering: An Effective Defense Against Spoofed Traffic", Feb. 2003, CSE, pp. 1-15. (Year: 2003).*

*Primary Examiner* — Sher A Khan
(74) *Attorney, Agent, or Firm* — Straub & Straub; Stephen T. Straub; Michael P. Straub

(57) ABSTRACT

Methods and apparatus for detecting and minimizing the effects of Denial Of Service (DOS) attacks in high-speed networks in which packet processing is carried out by multiple processing cores. In one embodiment of the invention a communications method and apparatus detects and deletes denial of service attack packets in a multi-core distributed packet processing system using a lightweight DOS attack packet detection and deletion process.

20 Claims, 13 Drawing Sheets

(56) References Cited

U.S. PATENT DOCUMENTS

| | | | | |
|---|---|---|---|---|
| 2006/0010389 A1* | 1/2006 | Rooney | ............... | H04L 63/1425 715/736 |
| 2007/0133419 A1* | 6/2007 | Segel | ..................... | H04L 47/10 370/236 |
| 2007/0289014 A1* | 12/2007 | Pyo | ........................ | H04L 63/02 726/22 |
| 2009/0028160 A1* | 1/2009 | Eswaran | ............... | H04L 45/745 370/395.32 |
| 2009/0271865 A1* | 10/2009 | Jiang | ................... | H04L 63/1425 726/23 |
| 2009/0288163 A1* | 11/2009 | Jacobson | .............. | G06F 15/173 726/22 |
| 2010/0122342 A1* | 5/2010 | El-Moussa | .......... | H04L 63/1425 726/22 |
| 2014/0189867 A1* | 7/2014 | Jung | ................... | H04L 63/1458 726/23 |

* cited by examiner

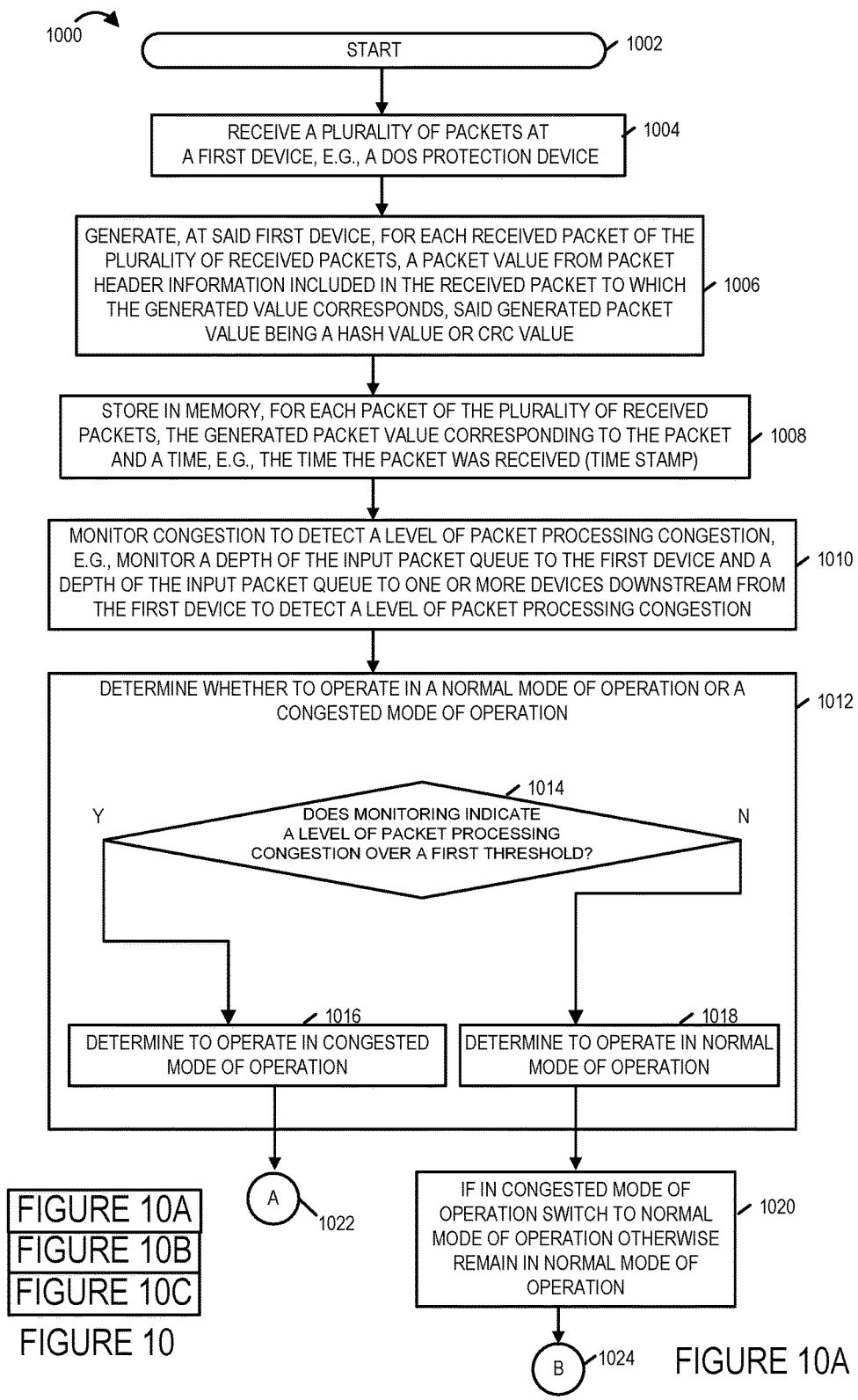

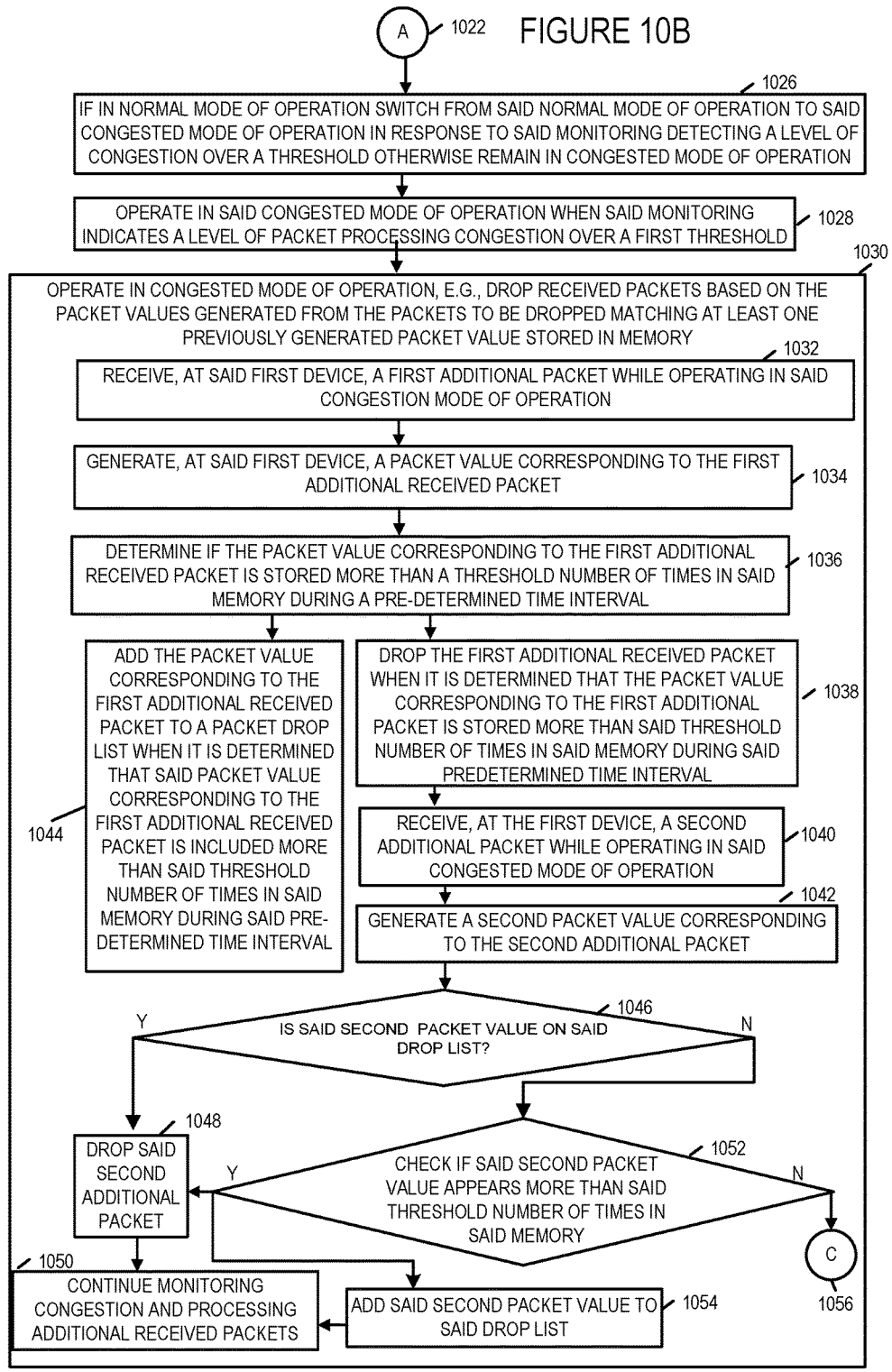

METHODS AND APPARATUS FOR DETECTING AND/OR DEALING WITH DENIAL OF SERVICE ATTACKS

RELATED APPLICATIONS

The present application is a continuation application of U.S. patent application Ser. No. 14/336,622 filed Jul. 21, 2014 which claims the benefit of U.S. Provisional Patent Application Ser. No. 62/014,683 filed Jun. 19, 2014 both of which are hereby expressly incorporated by reference in their entirety.

FIELD

The present application relates to methods and apparatus for detecting and minimizing the effects of Denial Of Service (DOS) attacks in high-speed networks in which packet processing is carried out by multiple processing cores.

BACKGROUND

While network link speeds have become increasingly faster going from 100 Mb/s to Gbps, 10 Gbps, 100 Gbps, the clock rate of microprocessors has increased very little. This has resulted in packet processing being increasingly carried out by multiple processing cores as it is impossible for a single processing core to keep up with the packet arrival rate. Typically the arriving packets are distributed to these multiple cores by sorting arriving packets into many packet flows based on their source addresses, destination addresses, source ports, destination ports, protocol identifier, and VLAN identifier with each packet processing core being responsible for processing a subset of the total packet flows. Using this approach the packet arriving order within each packet flow is maintained. For legitimate applications/users, each packet flow typically consumes a very small fraction of the link bandwidth (for example, an audio call's consumption is on the order of Kb/s while a video call consumes from a fraction of Mb/s to 10 s of Mb/s). When many thousands of these packet flows are distributed to multiple processing cores, their processing loads are fairly balanced. Together the multiple packet cores can keep up with the packet arrival rate.

However, processing loads are not fairly balanced in the presence of some service denial of service attacks. If an attacker user/application pumps a "fat" attack packet flow into the packet pipeline filling the unused link bandwidth up with attack packets, then one of the distributed packet processing cores will be overwhelmed, causing input queue congestion and/or packet discards, impacting services to well behaving legitimate applications/users (e.g., applications/users consuming typical amounts of bandwidth).

Some known pipelined packet processing systems include multiple stages wherein each processing stage is performed by a group of processing cores. This approach works well for most applications, including distributed DOS attacks, as traffic (legitimate packet flows or distributed denial of service flows) are fairly evenly distributed among the cores at each processing stage. However, if denial of service attackers users/applications send in packets that constitute one or a few "outsized" DOS packet flow(s), one or more initial or stage 1 processing cores as well as some later stage cores can be overwhelmed causing packet loss that can affect service to normal legitimate users/applications.

It should be appreciated that there is a need for methods and apparatus that can detect single oversized denial of service attack flows in distributed packet processing environments. It should be further appreciated that there is a need for methods and apparatus that can detect multiple oversized denial of service attack flows in distributed packet processing. It should be appreciated that there is a need for detecting or identifying attack packets without incurring too much processing cost. It should be appreciated that there is a need for methods and apparatus that can detect oversized denial of service attack flows in multi-core packet processing environments.

It should be further appreciated that there is a need for methods and apparatus that upon detection of oversized denial of service attack flows in distributed packet processing environments minimize their impact on legitimate packet flows. It should be appreciated that there is a need for methods and apparatus that can without too much processing cost identify and discard packets from an oversized denial of service attack flow.

It should be further appreciated that there is a need for a way to identify when processing congestion in various stages of a multistage packet processing system is caused by an oversized denial of service attack flow at an early stage in processing.

It should also be appreciated that there is a need for a way to identify denial of service attacks by monitoring multi-stage packet processing systems for congestion.

SUMMARY

Various embodiments, in accordance with the present invention, are directed to methods and apparatus for detecting fat flow denial of service attack packets and deleting the attack packets.

For example, a communications method for detecting and dropping DOS attack packets is described which includes the steps of receiving a plurality of packets at a first device; generating, at said first device, for each received packet of the plurality of received packets, a packet value from packet header information included in the received packet to which the generated value corresponds, said generated packet value being a hash value or CRC value; storing in memory, for each of the plurality of received packets, the generated packet value corresponding to the packet and a time; monitoring congestion to detect a level of packet processing congestion; operating in one of: i) a normal mode of operation, said operating in said normal mode of operation including passing received packets to a packet classifier or a packet policer without regard to said packet value generated from the packets being passed and ii) a congestion mode of operation, operating in said congestion mode of operation when said monitoring indicates a level of packet processing congestion over a first threshold, said operating in said congestion mode of operation including dropping received packets based on the packet value generated from the packets to be dropped matching at least one previously generated packet value stored in memory.

Various methods and apparatus in accordance with the present invention can detect single oversized denial of service attack flows in distributed packet processing environments such as communications, e.g., session border controllers. Some of the methods and apparatus can detect multiple oversized denial of service attack flows in distributed packet processing. The various methods and apparatus are able to detect or identify denial of service attack packets in oversized or fat flows without incurring too much processing cost that is the methods and apparatus utilize light computational processing solutions to detect and delete such denial of service attack packets. Various methods and apparatus in accordance with the present invention can also detect oversized denial of service attack flows in multi-core packet processing environments.

Furthermore, various methods and apparatus in accordance with the present invention upon detection of oversized denial of service attack flows in distributed packet processing environments minimize the denial of service attack flows impact on legitimate packet flows. Moreover, various embodiments of the present invention can without too much processing cost identify and discard packets from an oversized denial of service attack flow.

Various embodiments of the present invention include methods and apparatus that provide a way to identify when processing congestion in various stages of a multistage packet processing system is caused by an oversized denial of service attack flow at an early stage in processing. Furthermore, various embodiments of the present invention provide a way to identify denial of service attacks based on monitoring multi-stage packet processing systems for congestion with low processing costs.

While various exemplary embodiments and features have been described, numerous additional features and embodiments are described in the detailed description which follows.

BRIEF DESCRIPTION OF THE FIGURES

FIG. 10A is a first part of a flowchart of an exemplary communications method of detecting and deleting Denial of Service (DOS) attack packets in accordance with one embodiment of the present invention.

FIG. 10B is a second part of a flowchart of an exemplary communications method of detecting and deleting Denial of Service (DOS) attack packets in accordance with one embodiment of the present invention.

DETAILED DESCRIPTION

Figure 1:
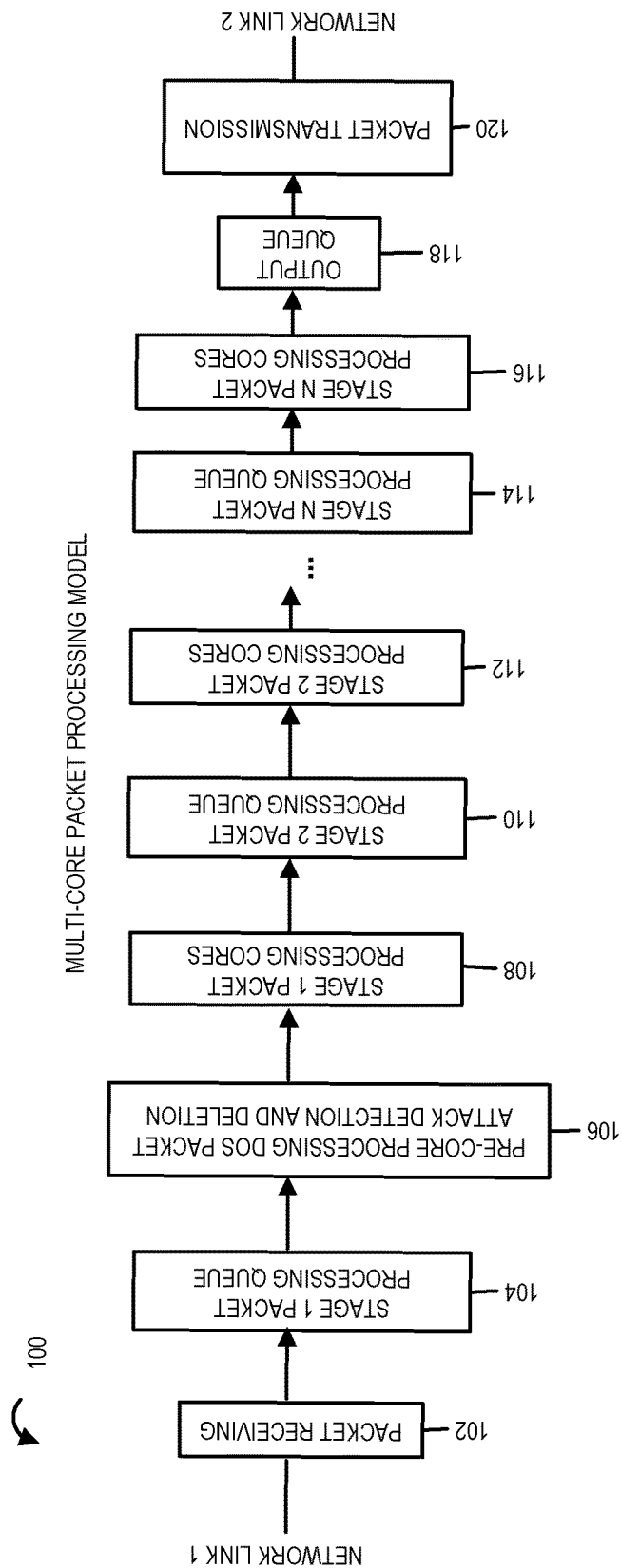
FIG. 1 illustrates an exemplary multi-core packet processing model in accordance with an exemplary embodiment of the present invention.

FIG. 1 illustrates an exemplary multi-core packet processing model 100 in accordance with one embodiment of the present invention. The multi-core packet processing model shows a set of processing stages and memory queues through which a received packet will traverse in accordance with an embodiment of the present invention. The multi-core packet processing model receives packet from network link 1 at packet receiving stage 102. After being received it will be placed in a stage 1 packet processing queue 104. From the stage 1 packet processing queue 104 the received packet will next be processed in a pre-core denial of service (DOS) packet attack detection and deletion processing stage 106, this stage is also referred to a DOS packet protection stage. If the packet is detected to be a denial of service attack packet in the DOS packet protection stage it will be deleted otherwise it will pass to one of the packet processing cores in the stage 1 packet processing cores 108 where the received packet will be processed in accordance with the functionality of the stage 1 packet processing cores such as for example, packet policing and/or packet classifying. If the packet is not dropped in the stage 1 packet processing cores 108, the received packet is passed to the stage 2 packet processing queue 110 which is an input queue to the stage 2 packet processing cores 112. From the stage 2 packet processing queue 110 the received packet is processed by the one of the stage 2 packet processing cores 112. Examples of stage 2 processing include packet decryption, re-assembly, filtering, policing, and/or monitoring of the received packet.

If the packet is not dropped in the stage 2 packet processing cores 112, the received packet is passed to additional stages of packet processing queues and associated packet processing cores. In the multi-core packet processing model 100, the receive packet will be received at stage N packet processing queue 114 after proceeding through any number of packet processing stages and associated input queues. The stage N packet processing queue 114 is an input queue to the stage N packet processing cores 116. From the stage N packet processing queue 114 the received packet is processed by one of the stage N packet processing cores 116.

If the packet is not dropped by one of the packet processing stage 1 to N the received and processed packet will be passed to the output queue 118. From the output queue 118 the processed packet is processed by packet transmission stage 120 in which it is transmitted out onto the network link 2.

The pre-core processing DOS packet attack detection and deletion stage is computationally lightweight and very fast process in comparison to the computationally intensive, time consuming, and/or complex packet processing that is performed in the stage 1 packet processing cores 108, stage 2 packet processing cores 112, . . . , stage N packet processing queue 114. Examples of the computationally intensive, time consuming, and/or complex packet processing that is performed in the stage 1 to N packet processing cores are packet policing, packet classification, packet decryption, packet encryption, deep packet inspection, and real-time protocol monitoring.

In the pipelined packet processing model 100 of FIG. 1 each processing stage is performed by a group of processing cores. This model works well for most applications, including dealing with distributed denial of service attacks, as traffic, i.e., legitimate packet flows or distributed denial of service attack flows, are fairly evenly distributed among the cores at each processing stage 1 to N. However, if denial of service attackers (e.g., users or applications) send in packets that constitute one or a few "outsized" denial of service packet flow(s), some stage 1 packet processing cores and in some cases some stage 2 packet processing cores can be overwhelmed, causing packet loss that affects service to normal users and applications.

The outsized packet flow also referred to as a fat packet flow refers to the large number of packets being sent in a flow by an attacker and does not refer to the size of the packets payload. By sending in a large number of packets in a single flow the denial of service attacker (e.g., malicious application) can overwhelm the packet processing core that is performing a packet classification process or packet decryption as these are computation intensive and time consuming processing.

The pre-core processing denial of service (DOS) packet attack detection and deletion stage 106 addresses the outsized or fat flow denial of service attack problem by detecting/recognizing when a congestion condition has occurred, identifying packets belonging to the outsized or fat denial of service attack flow(s) and deleting (i.e., discarding or dropping) the identified DOS attack packets.

The pre-core processing denial of service (DOS) packet attack detection and deletion stage 106 may be, and in some embodiments is implemented as a module and/or device with dedicated hardware to perform its operations of detecting and deleting denial of service attack packets. In some embodiments, one, more or all of the functions of the DOS packet attack detection and deletion stage 106 is implemented after the packet is received at packet receiving stage 102 and before a packet is placed in the stage 1 packet processing queue 104. The processing performed during the DOS packet attack detection and deletion stage is lightweight computationally and fast in comparison to the later stage packet classifying and packet decryption processing and therein is able to deal with the DOS attack packets without becoming overwhelmed.

In an exemplary embodiment the pre-core processing denial of service (DOS) packet attack detection and deletion stage keeps the packet hash value generated from packet header information and a time stamp of the time the packet was received for the last M (where M is a number) received packets in memory, e.g., in a history buffer such as an array of size M. For example in a hist_buf[M] which is an array associating received packet hash values with their received times.

In the exemplary embodiment, the pre-core processing denial of service (DOS) packet attack detection and deletion stage detects the packet processing congestion condition by determining the queue depth, that is the number of packets stored in the queue, for the input queues feeding one or more of the packet processing stages. In some embodiments, the depth of the stage 1 packet processing queue 104 and stage 2 packet processing queue 110 is monitored and when the depth of either the stage 1 packet processing queue 104 is detected as being greater than a first threshold or the depth of the stage 2 packet processing queue is detected as being greater than a second threshold, it is determined that the packet processing congestion is occurring. When it is determined that packet processing congestion is occurring, the DOS packet attack detection and deletion stage/module/device processing switches from a normal mode of operation to a congestion mode of operation.

In normal mode of operation, the pre-core processing DOS packet attack detection and deletion stage passes all packets without regard to their packet hash values or received times. However, in congestion mode of operation, the packet hash value for the current received packet that is the first packet in the queue to be passed to a stage 1 packet processing core is compared with the previous received packets. If the current packet hash value matches at least some attack threshold number of such packets in the history buffer of M previously received packets within a predetermined time period, then these packets with the matching packet hash values are considered to be arriving too frequently and are therefore identified that is detected as being DOS attack packets. The predetermined time period covers the case wherein there is a very light overall traffic flow where there might be multiple packets in the history buffer with the same packet hash value, even though they are not arriving at a high rate. However, when the current packet is determined to be a DOS attack packet it is discarded that is deleted or dropped, and the history buffer updated. The current packet hash value is added to an attack packet drop list that is maintained in memory. The next packet in the stage 1 packet processing queue is then processed by the pre-core processing DOS packet attack detection and deletion stage/module/device. If the next packet's hash value is in the attack packet drop list and has arrived within the predetermined time period it is also discarded. In some embodiments, if the next packet's hash value is in the attack packet drop list it is discarded without regard to the packet's arrival time. If the packet is not dropped, the next packet's hash value is checked to see if it matches at least some attack threshold number of such packet hash values in the history buffer of M previously received packets within the predetermined time period. If it does the packet is deleted and the packet hash value is added to the drop list. If this next packet's hash value is not detected at least the attack threshold number of times in the history buffer of M previously received packets within the predetermined time period then this next packet is passed on to the stage 1 packet processing core as it is determined not to be a DOS attack packet. The process is continually repeated until the congestion monitoring of the queue depths of the stage 1 packet processing queue and the stage 2 packet processing queue indicate that there is no longer packet processing congestion at which point the pre-core processing DOS packet attack detection and deletion stage 106 switches back to normal mode of operation and passes all packets without regard to their packet hash values or received times to the stage 1 packet processing cores 108.

Figure 11:
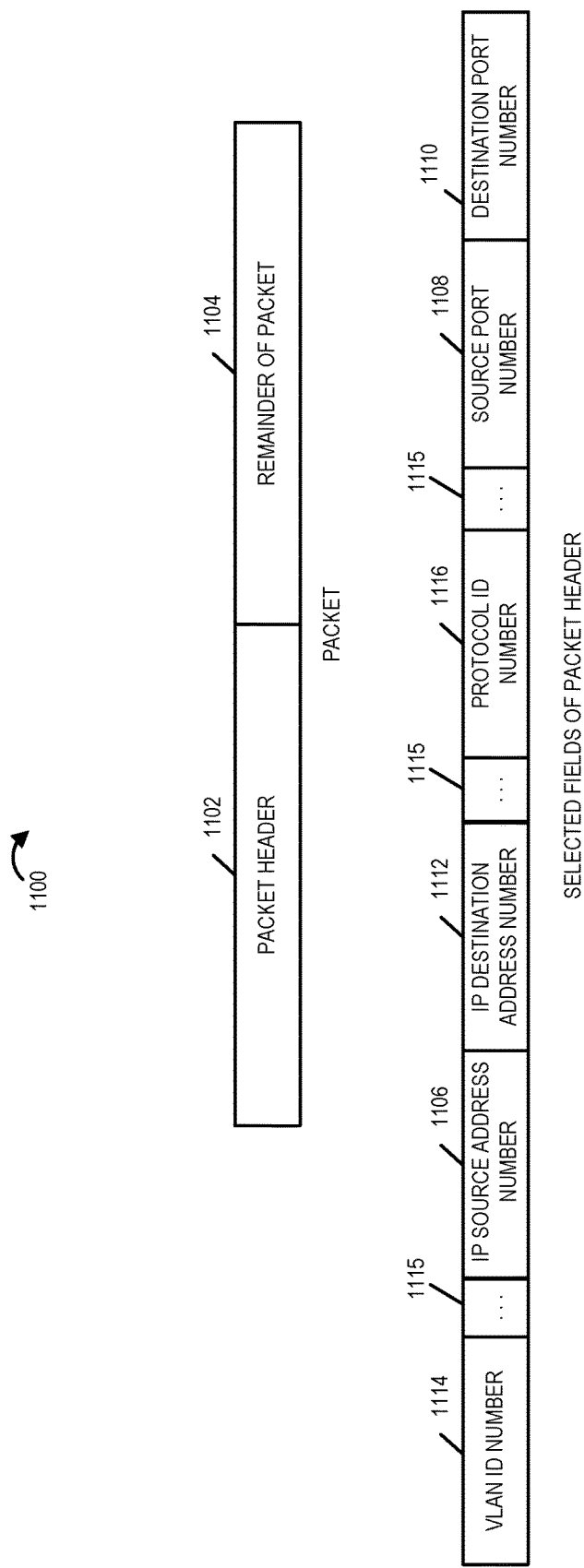
FIG. 11 illustrates an exemplary packet and selected packet header fields.

In some embodiments, instead of a packet hash value a packet CRC value is generated from packet header information and used in the process described above. FIG. 11 illustrates an exemplary drawing 1100 showing a packet made up of a packet header 1102 and the remainder of the packet 1104. Additionally, in the drawing 1100 selected fields of the packet header are shown including the IP source address number 1106, the source port number 1108, the destination port number 1110, the IP destination address number 1112, the VLAN (Virtual Local Area Network) number 1114, and protocol identification number 1116. In some embodiments, the protocol identification number 1116 is the "Protocol" or "NextHdr" field within an IPV4 or IPV6 header. Elements 1115 of FIG. 11 represent additional header fields other than the selected fields of the packet header shown. The packet hash value or packet CRC value is generated based on at least three or more of these packet header fields. In some embodiments, the packet hash value or packet CRC value is generated from four or more of these header fields. In some embodiments, the packet hash value or packet CRC value is generated from five or more of these header fields. In some embodiments, the packet header values are generated using all six header fields. In some embodiments, all six header fields are used and only these six header fields are used to generate the packet hash value or packet CRC value. Generating the packet value (either hash values or CRC values) can be, and in some embodiments is, performed in dedicated hardware circuitry which reduces the processing time and overhead. This packet header information has been chosen because it is useful in uniquely identifying packet flows and sources of packet flows.

With respect to the multi-core packet processing model the queues 104, 110, 114, and 118 may be, and in some embodiments are, implemented in a single memory that is logically partitioned and which includes the history buffer. In some embodiments, the queues 104, 110, 114, 118 and the history buffer are located in separate memory or a combination of shared and individual memory. Additionally, the packet receiving stage 102, pre-core processing DOS packet attack detection and deletion stage 106, stage 1 packet processing cores 108, stage 2 packet processing cores 112, . . . , stage N packet processing cores 116, and packet transmission stage 120 may be, and in some embodiments are, implemented in hardware, software, or a combination of hardware and software. Furthermore, these stages may be, and in some embodiments are implemented as hardware modules, software modules or a combination of hardware and/or software modules. In some embodiments, all processing stages 102, 106, 108 112, 116, and 120 and the memory for all queues 104, 110, 114 and 118 are included in a single device or apparatus such as an integrated circuit or semiconductor chip and processing is performed within the device or apparatus. In some embodiments the apparatus is a Session Border Controller.

Figure 2:
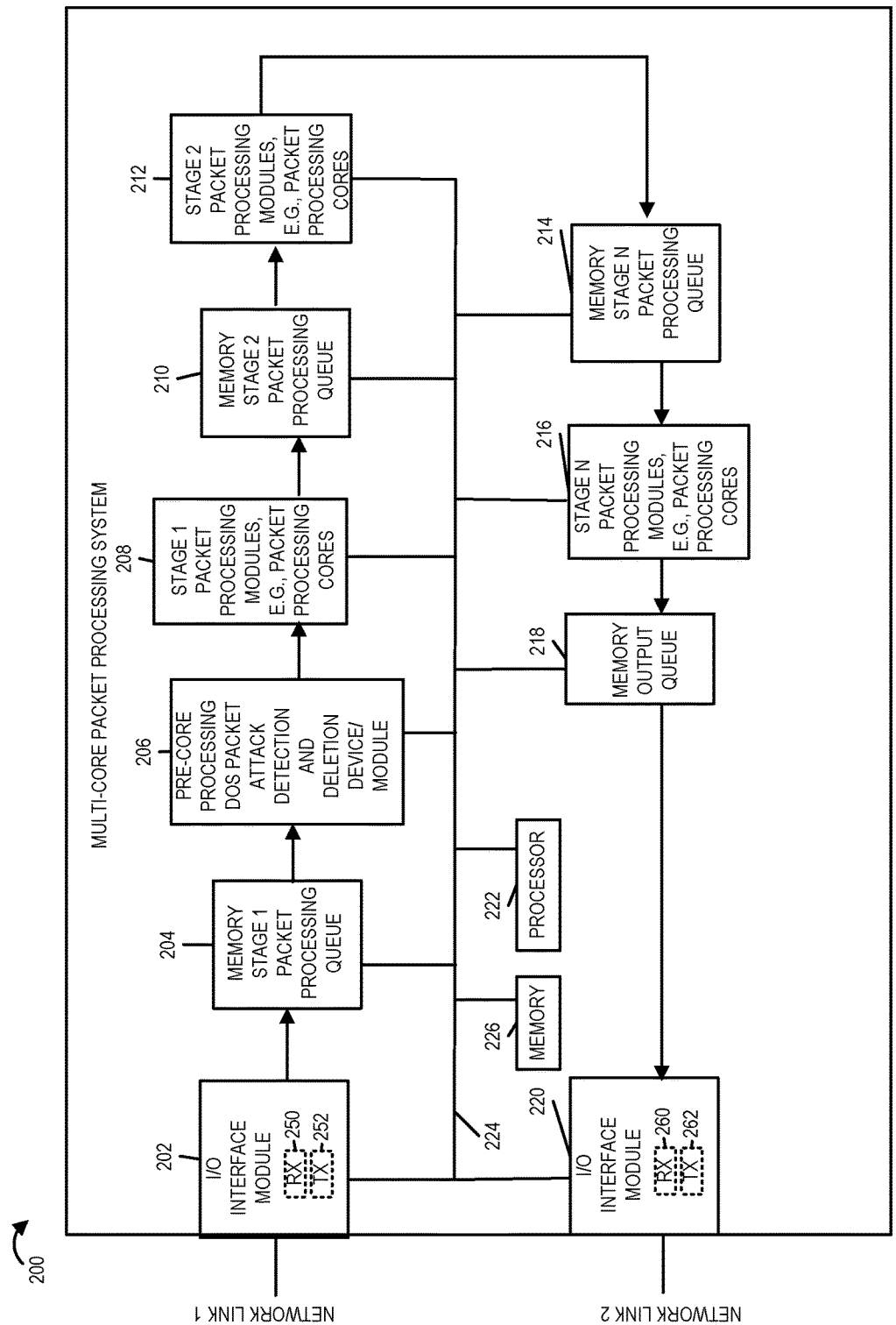
FIG. 2 illustrates an exemplary multi-core packet processing system in accordance with an exemplary embodiment of the present invention.

FIG. 2 illustrates a multi-core packet processing communications system in accordance with one embodiment of the present invention. The system may be, and in some embodiments, is incorporated into a single apparatus such as a session border controller or a device such as integrated circuit with dedicated hardware for one or more of the modules shown.

The multi-core packet processing system 200 of FIG. 2 includes an input/output I/O interface module 202 coupled to network link 1, a memory stage 1 packet processing queue 204, a pre-core processing attack detection and deletion device/module 206 which is also referred to a DOS protection device or module, stage 1 packet processing modules 208, e.g., stage 1 packet processing cores, memory stage 2 packet processing queue 210, stage 2 packet processing modules 212, e.g., stage 2 packet processing cores, memory stage N packet processing queue 214, a stage N packet processing modules 216, e.g., stage N packet processing cores, memory output queue 218, a processor 222, memory 226, an I/O interface module 220 coupled to a network line 2, and a link 224 such as bus connecting the processor, memory and modules. Additionally, there are direct links between various modules and memory queues. The I/O interface module 202 includes a receiver 250 and a transmitter 252 and the I/O interface module 220 includes a receiver 260 and a transmitter 262.

Figure 3:
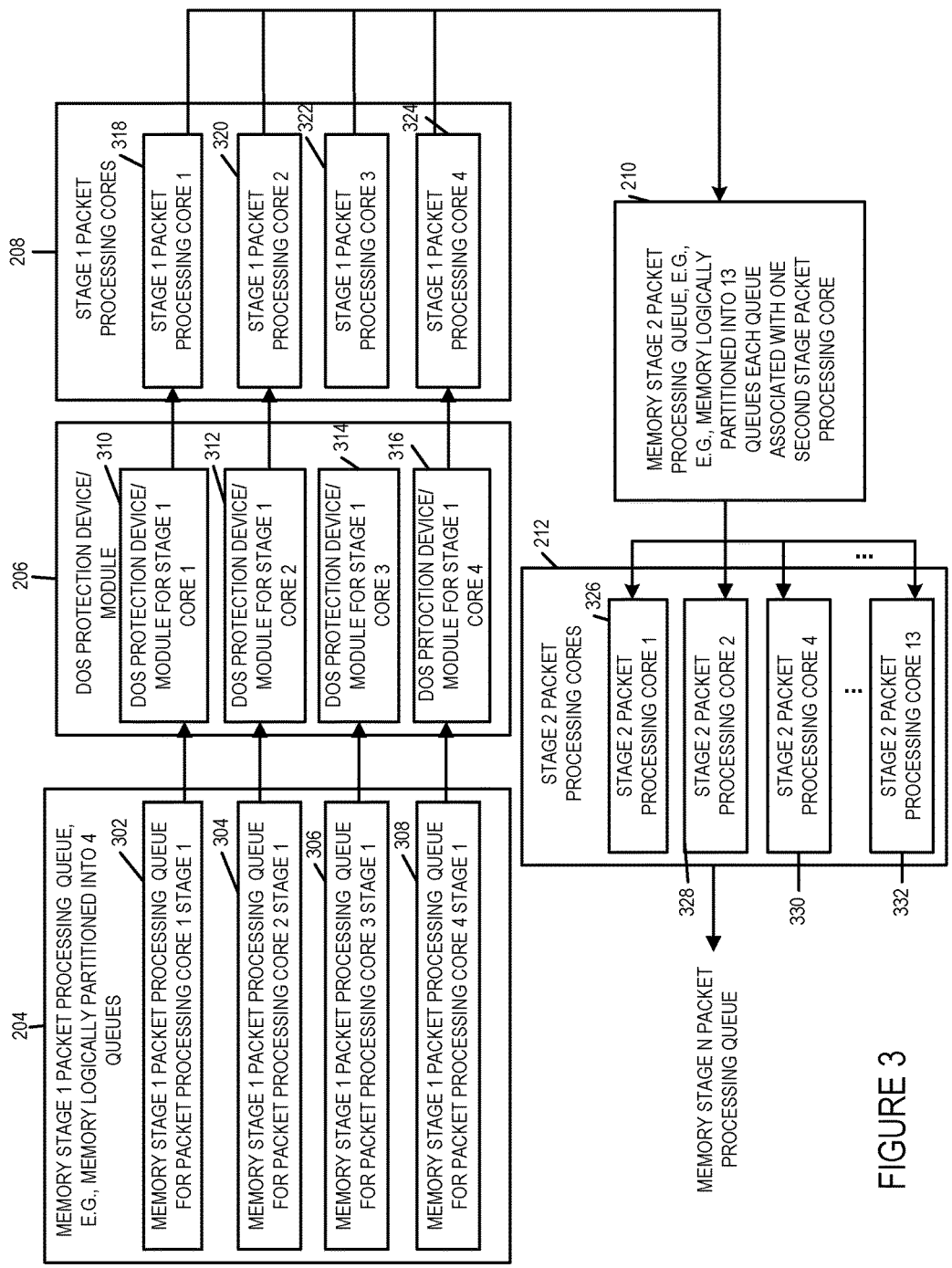
FIG. 3 illustrates exemplary packet processing queues, packet processing cores and a denial of service device/module in accordance with an exemplary embodiment of the present invention.

FIG. 3 illustrates further details of the memory stage 1 packet processing queue 204, the DOS protection device/module 206, the stage 1 packet processing modules 208 shown as packet processing cores, the memory stage 2 packet processing queues 210, and stage 2 packet processing modules 212 shown as packet processing cores. Elements with the same numbers are the same or similar to those already described in one or more of the previous figures.

Packets received by the I/O Interface module 202 receiver 250 are placed in the memory stage 1 packet processing queue. In this exemplary embodiment, the queue's maximum depth is the maximum number of entries in the queue for packets and associated information. In one embodiment the maximum queue depth is 8000 meaning that the memory stage 1 packet processing queue can receive and store up to a maximum of 8000 entries. Each entry being a packet and related information such as, for example, the packet size, offset to IP header, packet hash value and the time the packet was received. The memory stage 1 packet processing queue in this exemplary embodiment is physical memory which is logically partitioned into 4 separate queues: memory stage 1 packet processing queue for packet processing core 1 stage 1302, memory stage 1 packet processing queue for packet processing core 2 stage 1304, memory stage 1 packet processing queue for packet processing core 3 stage 1, and memory stage 1 packet processing for packet processing core 4 stage 1.

In an exemplary embodiment of the present invention, a packet hash value is generated by the processor 222 from the received packets header information, e.g., the IP source address number 1106, source port number 1108, destination port number 1110, IP destination number 1112, VLAN ID number 1114 and Protocol Identification number 1116 shown in FIG. 11. In some embodiments the interface module 202 generates the packet hash value instead of the processor 222. The processor 222 (or in some embodiments the interface module 202) then based on the last 2 bits of the received packets hash value places the packet into one of the four logical memory stage 1 packet processing queues 302, 304, 306 or 308. For example, a packet with a packet hash value of XXXX00 where X is either a 1 or 0 is placed into memory stage 1 packet processing queue for packet processing core 1 stage 1302. A packet with a packet hash value of XXXX01 where X is either a 1 or 0 is placed into memory stage 1 packet processing queue for packet processing core 2 stage 1304. A packet with a packet hash value of XXXX10 where X is either a 1 or 0 is placed into memory stage 1 packet processing queue for packet processing core 3 stage 1306. A packet with a packet hash value of XXXX11 where X is either a 1 or 0 is placed into memory stage 1 packet processing queue for packet processing core 4 stage 1308. In this way the received packets are distributed to by the different stage 1 packet processing cores.

While the memory for the stage 1 packet processing queue is logically partitioned in this exemplary embodiment the logical partition is variable. This means that while the overall physical amount of memory allocated for the memory stage 1 packet processing queue is fixed, for example at 8000 entries, the amount of memory and therefore the queue size or maximum depth (i.e., number of entries) of the memory stage 1 packet processing queue for packet processing core 1 stage 1302, memory stage 1 packet processing queue for packet processing core 2 stage 1304, memory stage 1 packet processing queue for packet processing core 3 stage 1306 and memory stage 1 packet processing queue for packet processing core 4 stage 1308 varies over time with the number of entries from the total exemplary 8000 entries be allocated differently at different time to each of the four sub-queues 302, 304, 306, and 308.

For example at one time the logical partition may be 2000 entries allocated to queue 302, 2000 entries allocated to queue 304, 2000 entries allocated to queue 306 and 2000 entries allocated to queue 308. At a different time, for example when more packets are being received and assigned to be processed by the stage 1 packet processing core 1 then the other stage 1 packet processing cores, the processor 222 (or in some embodiments the interface module 202) may logically partition the physical memory stage 1 packet processing queue as follows: 4000 entries allocated for logical queue 302, 2000 allocated for logical queue 304 and 1000 entries allocated for logical queue 306 and 1000 entries for allocated for logical queue 308. In this exemplary system the queue depth of the memory stage 1 packet processing queue 204 is the total number of entries or packet and associated information stored in entire queue 204 regardless of which individual logical queue 302, 304, 306 or 308 they have been stored in. For example, when 1000 packets are stored in logical queue 302, 1000 packets are stored in logical queue 304, 1000 packets are stored in logical queue 306 and 1000 packets are stored in logical queue 308 the queue depth for the queue 204 is 4000. This means that 4000 of the 8000 total entries in queue 4000 have been used up to store packets and associated information and that 4000 additional entries are available to store packets before the queue is full. When the queue becomes full the exemplary system will either not store newly received packets and lose those packets or will delete or overwrite the packets already stored in the queue. In this exemplary embodiment when the queue has more than 7600 entries of the 8000 total available entries in the queue filled with packets and associated information being stored and waiting to be processed by the stage 1 packet processing cores the system is considered to be congested that is it is experiencing packet processing congestion. The 7600 entries equates to 95% of the available memory space of the total number of 8000 entries available. In this exemplary embodiment, 7600 is a threshold queue depth over which the system will be determined to be experiencing packet processing congestion.

The denial of service protection device/module 206 consists of four devices or modules DOS protection device/module for stage 1core 1 310, DOS protection device/module for stage 1 core 2, 312, DOS protection device/module for stage 1core 3 314, and DOS protection device/module for stage 1core 4 316. DOS protection device 310 receives packets from logical queue 302 of queue 204. DOS protection device 312 receives packets from logical queue 304 of queue 204. DOS protection device 314 receives packets from logical queue 306 of queue 204. DOS protection device 316 receives packets from logical queue 308 of queue 204. The operation of the DOS protection devices is similar and will now be explained in connection with DOS protection device 310.

DOS protection device 310 receives a plurality of packets, generates, for each received packet of the plurality of received packets, a packet value from packet header information included in the received packet to which the generated value corresponds, said generated packet value being a hash value or CRC value, stores in memory, for each received packet of the plurality of received packets, the generated packet value corresponding to the packet and the time the packet was received, and monitors congestion to detect a level of packet processing congestion. The DOS protection device has two modes of operation a normal mode of operation and a congested mode of operation. When the level of monitored congestion is below a first threshold, the DOS protection device 310 operates in the normal mode of operation during which passes the received packets to the stage 1 packet processing core 1 318 of the stage 1 packet processing cores 208 without regard to said packet value generated from the packets being passed. When the monitoring indicates a level of packet processing congestion over a first threshold, the DOS protection device operates in the congestion mode of operation during which includes dropping received packets based on the packet value generated from the packets to be dropped matching at least one previously generated packet value stored in memory, e.g., a history buffer memory of the last 16 packets the DOS protection device 310 processed. In some embodiments, the aforementioned monitoring congestion to detect a first level of packet processing congestion includes monitoring a first queue and wherein said first level of packet processing congestion is a depth of packets stored in said first queue. In this exemplary embodiment, the first queue is the memory stage 2 packet processing queue 210 which is a queue located downstream of the DOS protection device 310. The first threshold is a first queue depth threshold. For illustrative purposes if the maximum queue depth or size of queue 210 is 160 and the first queue depth threshold is 128 then when the monitoring of the queue depth for queue 210 indicates that there are more than 128 packets stored in the queue 210 then the monitoring has detected a level of congestion over the first threshold. In this example, when more than approximately 80% of the memory stage 2 packet processing queue is the system is experiencing packet processing congestion over the first threshold. This indicates that processing to the stage 2 packet processing cores is backing up and that a potential fat flow DOS packet attack is occurring. By way of clarification a queue located downstream from the DOS protection device is a queue that receives packets after they have been processed by the DOS protection device. The memory stage 2 packet processing queue is downstream from the DOS protection device while the memory stage 1 packet processing queue is upstream from the DOS protection device.

In some embodiments, the DOS protection device also monitors a second queue to detect a second level of packet processing congestion at said second queue and the DOS protection device also operates in the congestion mode of operation when the monitoring of the second queue indicates a second level of packet processing congestion over a second threshold. In this example, the second queue is the memory stage 1 packet processing queue 204 located upstream of DOS protection device 310 and the second level of packet processing congestion is a depth of packets stored in memory stage 1 packet processing queue 204 and the second threshold is a second queue depth threshold. For illustrative purposes, the memory stage 1 packet processing queue has 8000 entries that have been logically partitioned among the queues 302, 304, 306, and 308. The second threshold is 7600 and the total number of packets stored in queue 204 is 7610. The queue depth of 7610 is above the threshold of 7600 which is 95% of the total capacity of the queue 204. As 7610 is more than the threshold queue depth of 7600 monitoring of the second queue indicates a second level of packet processing congestion over the second threshold of 7600 and therefore the DOS protection device 310 operates in the congested mode of operation.

Figure 8:
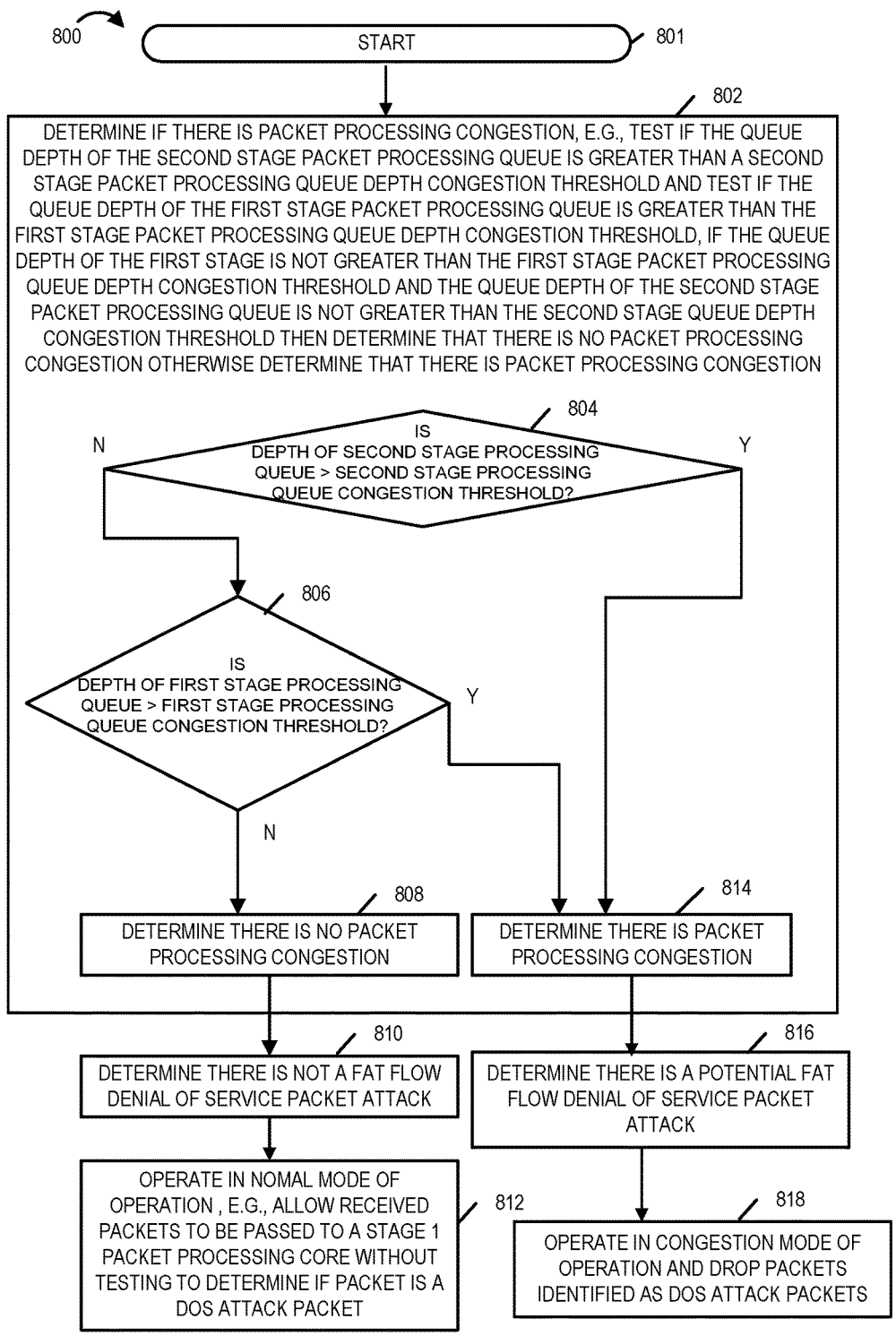
FIG. 8 illustrates a flowchart of an exemplary routine for monitoring the level of processing congestion in accordance with one embodiment of the present invention.

Flowchart 800 of FIG. 8 illustrates an exemplary routine that may be, and in some embodiments is performed by the DOS protection device for monitoring the level of processing congestion to determine if there is a level of packet processing congestion indicating a level of congestion over a threshold indicative of a potential fat flow denial of service attack. In this exemplary embodiment, the DOS protection device 310 is the same as the DOS packet attack protection device 500 of FIG. 5 which is described in further detail below. In connection with the exemplary routine 800, processor 508 of DOS protection device 500 performs the processing operations of the steps of the routine.

Processing for routine 800 commences at start step 801 and then proceeds to step 802. In step 802, operations are performed to determine if there is packet processing congestion. In step 802 sub-steps 804, 806, 808 and 814 are performed.

In sub-step 804, a check is made to determine if the depth of the second stage processing queue (e.g., stage 2 packet processing input queue) is greater than the second stage processing congestion threshold. If it is then processing proceeds to sub-step 814. If it is not then processing proceeds to sub-step 806. In sub-step 806 a check is made as to whether the depth of the first stage processing queue (e.g., stage 1 packet processing input queue) is greater than a first stage processing queue congestion threshold. If it is then processing proceeds to step 814 otherwise processing proceeds to step 808.

In step 814 it is determined that there is a level of packet processing congestion of a predetermined threshold. Processing proceeds from step 814 to step 816 where it is determined that there is a potential fat flow denial of service packet attack underway. Processing proceeds from step 816 to step 818 in which the DOS protection device is configured to operate in the congestion mode of operation and drops packets it is identifies as denial of service attack packets.

In step 808 it is determined that there is no level of packet processing congestion of the predetermined threshold (queue depths). Processing proceeds from step 808 to step 810 where it is determined that there is not a fat flow denial of service packet attack underway based on the level of congestion determined from monitoring the queue depths of the first and second stage queues. Processing proceeds from step 810 to step 812 where the DOS protect device is configured to operate in its normal mode of operation that is it allows received packets to pass to a first stage (e.g., stage 1 packet processing core) without testing the packet to determine if the packet is a DOS attack packet.

Each of the DOS protection devices 310, 312, 314, and 316 detects and deletes DOS attack packets when operating in congestion mode. The packets the DOS protection devices 310, 312, 314, and 316 pass packets determined not be DOS attack packets to the stage 1 packet processing cores 318, 320, 322, and 324 respectively as shown in the diagram. These cores are part of the stage 1 packet processing cores 208. After processing the packets are passed from the stage 1 packet processing cores 318, 320, 322, and 324 to the memory stage 2 packet processing queue 210 as shown. From memory queue 210 the received packets are distributed to the stage 2 packet processing cores 1 326, core 2 328, core 3 330, . . . , core 13 of stage 2 packet processing cores 212 where they undergo further processing, e.g., packet re-assembly or decryption. From the stage 2 packet processing cores 212 the received packets are passed to the memory stage N packet processing queue.

Figure 4:
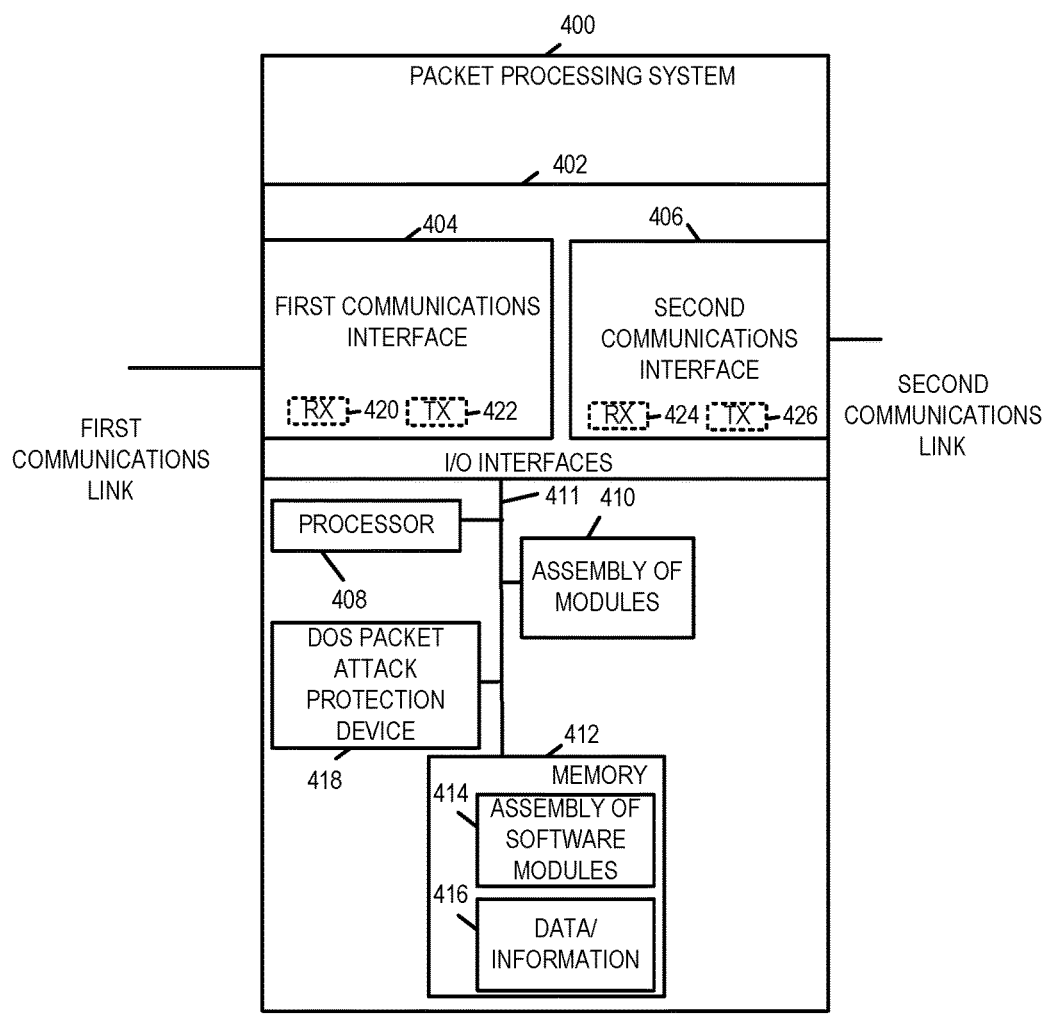
FIG. 4 illustrates an exemplary packet processing communications system in accordance with an exemplary embodiment of the present invention.

FIG. 4 is a drawing of another exemplary packet processing communications system in accordance with an exemplary embodiment of the present invention. Packet processing communications system 400 may be implemented as a collection of separate devices or as a single apparatus or device. Packet processing system 400 may be, and in some embodiments is, implemented in integrated circuit such as a semiconductor chip.

Exemplary packet processing communications system 400 includes I/O interfaces 402, a processor 408, a DOS packet attack protection device 418 which may also be a module, e.g., an assembly of circuits, an assembly of modules 410, e.g., an assembly of circuits, and memory 412, coupled together via a bus 411 over which the various elements may interchange data and information. I/O interfaces 402 includes a plurality of interfaces including a first communications interface 404 and a second communications interface 406. In some embodiments, the first communications interface 404 includes a receiver 420 and a transmitter 422. In some embodiments, the second communications interface 406 includes a receiver 424 and a transmitter 426. Memory 412 includes an assembly of software modules 414 and data/information 416. Though only one DOS packet protection device is shown the packet processing communications system 400 may, and in some embodiments, does include one DOS packet protection device for each first stage packet processing module to which received packets will be distributed.

Exemplary first communications interface 404 couples packet processing system 400 to a first communications link, e.g., first network link, from which it receives packets to be processed. Exemplary second communications interface 406 couples the packet processing system 400 to a second communications link, e.g., second network link over which the packet processing system transmits packets that the packet processing system has processed.

Figure 5:
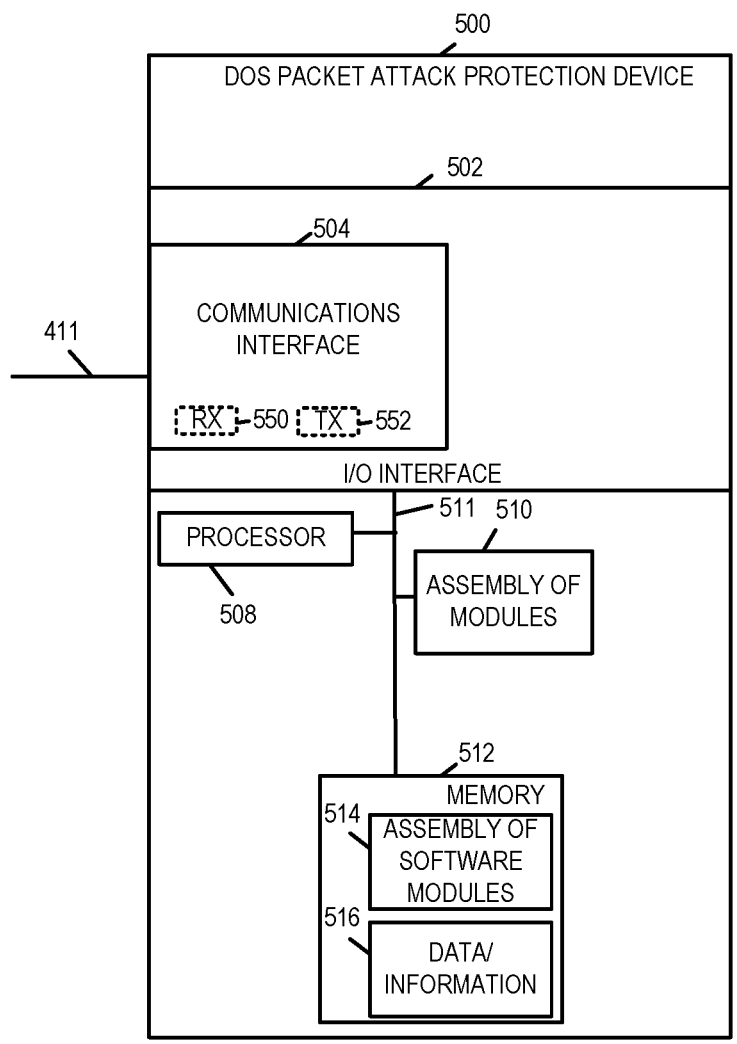
FIG. 5 illustrates an exemplary Denial Of Service (DOS) packet attack protection device in accordance with an exemplary embodiment of the present invention.

FIG. 5 illustrates in further detail an exemplary DOS packet attack protection device 418 in accordance with an exemplary embodiment. DOS packet attack protection device 500 may be implemented as a module instead of a device. Exemplary DOS Packet Attack Protection Device 500 includes I/O interfaces 502, a processor 508, an assembly of modules 510, e.g., an assembly of circuits, and memory 512, coupled together via a bus 511 over which the various elements may interchange data and information. I/O interfaces 502 includes one or more interfaces with an exemplary communications interface 504 shown. In some embodiments, the communications interface 504 includes a receiver 550 and a transmitter 552. The communications interface 504 may be, and in some embodiments is, coupled to 411 of packet processing system 400. Memory 512 includes an assembly of software modules 514 and data/information 516. The data/information memory 516 is used for storing data and information such as the received packets, generated time stamps of when an associated packet was received, generated packet values (e.g., packet hash values, packet CRC values), associated packet receive times, history buffer contents, dropped packet list, and other information, data and variables used during processing operations.

Figure 6:
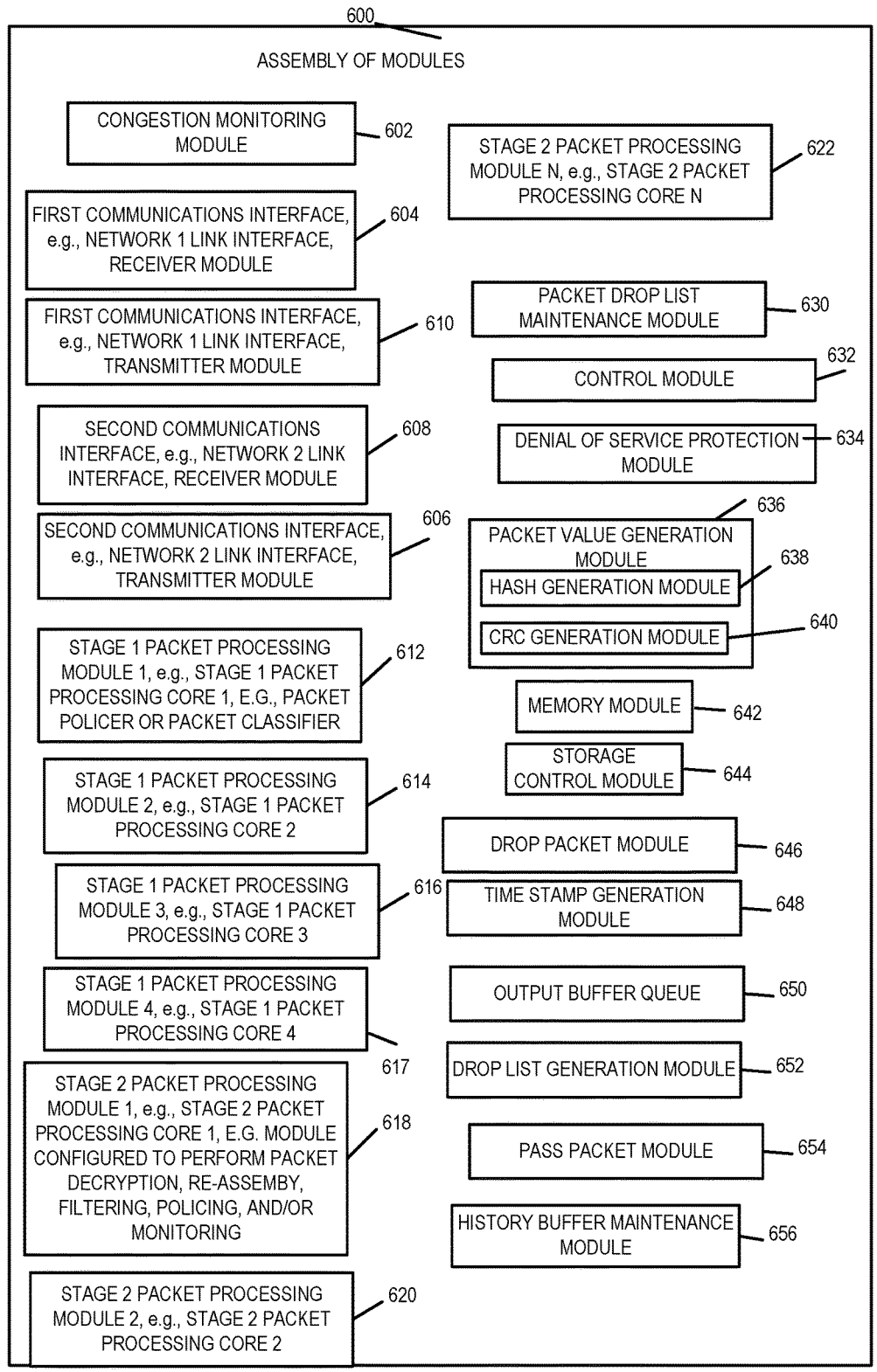
FIG. 6 illustrates an exemplary assembly of modules which may be included in a communications system and/or apparatus in accordance with an exemplary embodiment of the present invention.

FIG. 6 is a drawing of assembly of modules 600 which may be, and in some embodiments is, included in exemplary Packet Processing Communications System 400 illustrated in FIG. 4. The modules in the assembly of modules 600 may, and in some embodiments are, implemented fully in hardware within the processor 408, e.g., as individual circuits. The modules in the assembly of modules 600 may, and in some embodiments are, implemented fully in hardware within the assembly of modules 410, e.g., as individual circuits corresponding to the different modules. In other embodiments some of the modules are implemented, e.g., as circuits, within the processor 408 with other modules being implemented, e.g., as circuits within assembly of modules 410 and/or within I/O interfaces 402, external to and coupled to the processor 408. As should be appreciated the level of integration of modules on the processor and/or with some modules being external to the processor may be one of design choice.

Alternatively, rather than being implemented as circuits, all or some of the modules included in assembly of modules 600 may be implemented in software and stored in the memory 414 of the Packet Processing System 400, with the modules controlling operation of Packet Processing System 400 to implement the functions corresponding to the modules when the modules are executed by a processor, e.g., processor 408. In some such embodiments, the assembly of modules 600 is included in the memory 412 as assembly of software modules 414. In still other embodiments, various modules in assembly of modules 600 are implemented as a combination of hardware and software, e.g., with another circuit external to the processor providing input to the processor 408 which then under software control operates to perform a portion of a module's function. While shown in the FIG. 4 embodiment as a single processor, e.g., computer, it should be appreciated that the processor 408 may be implemented as one or more processors, e.g., processing cores, computers.

When implemented in software the modules include code, which when executed by the processor 408, configure the processor 408 to implement the function corresponding to the module. In embodiments where the assembly of modules 600 is stored in the memory 414, the memory 414 is a computer program product comprising a computer readable medium comprising code, e.g., individual code for each module, for causing at least one computer, e.g., processor 408, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the Packet Processing System 400 or elements therein such as the processor 408, to perform functions of corresponding steps illustrated in the method flowchart 1000 of FIG. 10. Thus the assembly of modules 600 includes various modules that perform functions of corresponding steps of the methods shown in FIGS. 8 and 10.

Assembly of modules 600 includes a congestion monitoring module 602, a first communications interface, e.g., Network 1 Link Interface, receiver module 604, a first communications interface, e.g., Network 1 Link Interface, transmitter module 610 a second communications, e.g., Network 2 Link Interface, receiver module 608, a second communications interface, e.g., Network 2 Link Interface, transmitter module 606 a stage 1 packet processing module 1, e.g., stage 1 packet processing core 1, e.g., packet policer or packet classifier 612, a stage 1 packet processing module 2, e.g., stage 1 packet processing core 2 614, a stage 1 packet processing module 3, e.g., stage 1 packet processing core 3 616, a stage 1 packet processing module 4, e.g., stage 1 packet processing core 4 617, a stage 2 packet processing module 1, e.g., stage 2 packet processing core 1, e.g., module configured to perform packet decryption, re-assembly, filtering, policing, and/or monitoring 618, a stage 2 packet processing module 2, e.g., stage 2 packet processing core 2 620, stage 2 packet processing module N, e.g., stage 2 packet processing core N 622 wherein N indicates that any number of packet processing modules may be used, a packet drop list maintenance module 630, a control module 632, a denial of service protection module 634 also sometimes referred to as a pre-core processing DOS packet attack detection or deletion module or a DOS packet attack detection module, a packet value generation module 636 which includes one or more of hash generation module 638 or a CRC generation module 640, a memory module 642, a storage control module 644, a drop packet module 646, a time stamp generation module 648, an output buffer queue 650, drop list generation module 652, pass packet module 654 and a history buffer maintenance module 656.

While only four stage 1 packet processing modules are shown in this example any number of stage 1 packet processing modules may be used in various embodiments of the present invention. While only 1 denial of service protection module 634 is shown in this example, most embodiments include one denial of service protection module for each stage 1 packet processing module used in the system. Also while in this example only two stages of packet processing modules have been shown there may be many stages of packet processing modules wherein there are any number of modules for each stage of packet processing.

The data/information memory 416 is used for storing data and information such as the received packets, generated time stamps of when an associated packet was received, generated packet values (e.g., packet hash values, packet CRC values), associated packet receive times, history buffer contents, queues such as stage 1 input packet processing queues, stage 2 input packet processing queues, output queues, dropped packet list, and variables used during processing operations.

Figure 7:
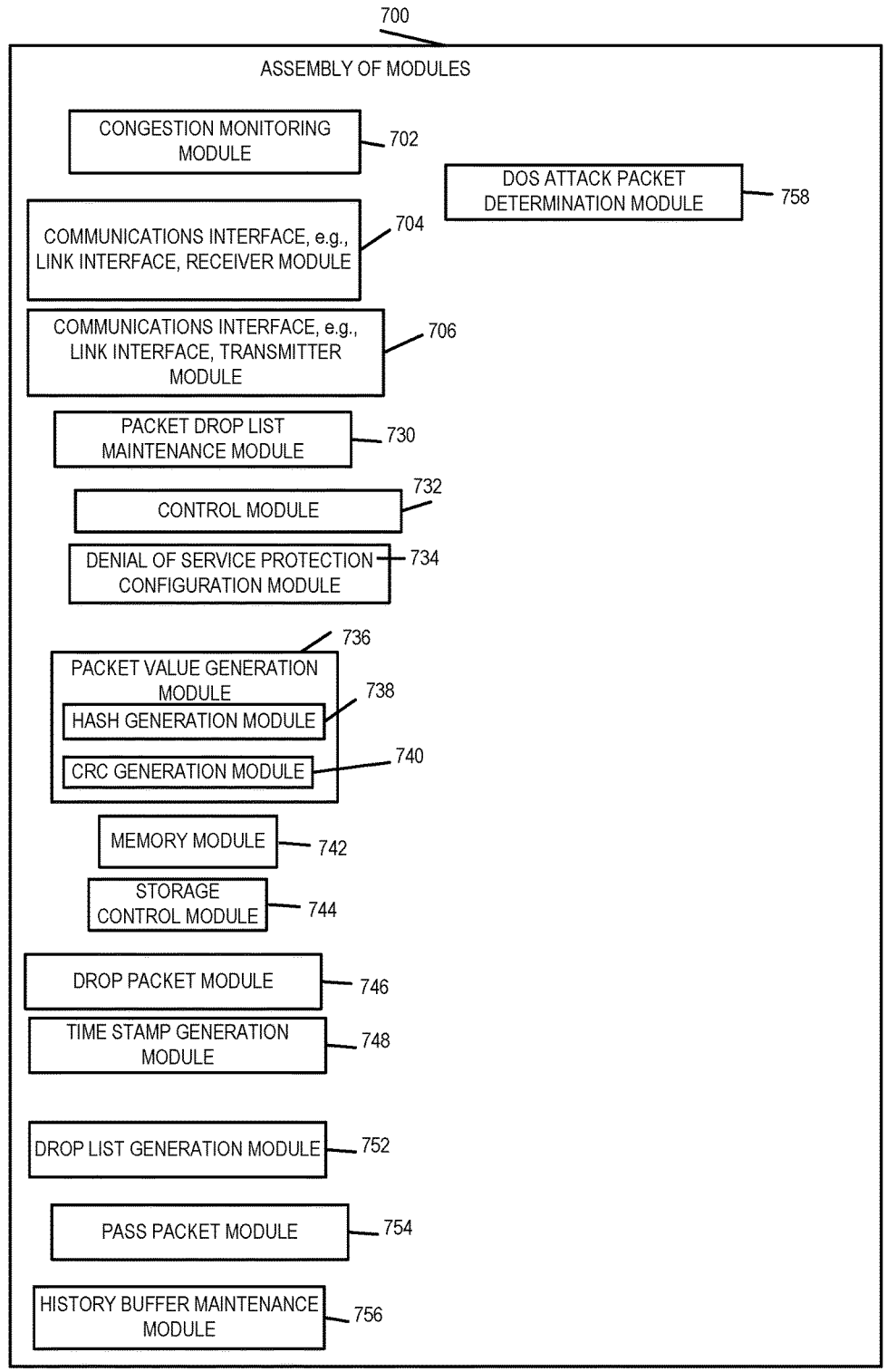
FIG. 7 illustrates an exemplary assembly of modules which may be included in a denial of service packet attack protection device and/or module in accordance with an exemplary embodiment of the present invention.

FIG. 7 is a drawing of assembly of modules 700 which may be, and in some embodiments is, included in exemplary DOS Packet Attack Protection Device 500 illustrated in FIG. 5. The modules in the assembly of modules 700 may, and in some embodiments are, implemented fully in hardware within the processor 508, e.g., as individual circuits. The modules in the assembly of modules 700 may, and in some embodiments are, implemented fully in hardware within the assembly of modules 510, e.g., as individual circuits corresponding to the different modules. In other embodiments some of the modules are implemented, e.g., as circuits, within the processor 508 with other modules being implemented, e.g., as circuits within assembly of modules 510 and/or within I/O interfaces 402, external to and coupled to the processor 408. As should be appreciated the level of integration of modules on the processor and/or with some modules being external to the processor may be one of design choice.

Alternatively, rather than being implemented as circuits, all or some of the modules included in assembly of modules 700 may be implemented in software and stored in the memory 514 of the DOS Packet Attack Protection Device 500, with the modules controlling operation of the DOS Packet Attack Protection Device 500 to implement the functions corresponding to the modules when the modules are executed by a processor, e.g., processor 508. In some such embodiments, the assembly of modules 700 is included in the memory 512 as assembly of modules 514. In still other embodiments, various modules in assembly of modules 700 are implemented as a combination of hardware and software, e.g., with another circuit external to the processor providing input to the processor 508 which then under software control operates to perform a portion of a module's function. While shown in the FIG. 5 embodiment as a single processor, e.g., computer, it should be appreciated that the processor 508 may be implemented as one or more processors, e.g., processing cores, computers.

When implemented in software the modules include code, which when executed by the processor 508, configure the processor 508 to implement the function corresponding to the module. In embodiments where the assembly of modules 700 is stored in the memory 512, the memory 514 is a computer program product comprising a computer readable medium comprising code, e.g., individual code for each module, for causing at least one computer, e.g., processor 508, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the DOS Packet Attack Detection Device 500 or elements therein such as the processor 508, to perform functions of corresponding steps illustrated in the method flowchart 1000 of FIG. 10. Thus the assembly of modules 700 includes various modules that perform functions of corresponding steps of the methods shown in FIG. 10.

Assembly of modules 700 includes a congestion monitoring module 702, a communications interface, e.g., Link Interface, receiver module 704, a communications interface, e.g., Link Interface, transmitter module 706, a packet drop list maintenance module 730, a control module 732, a packet value generation module 736 which includes one or more of hash generation module 738 or a CRC generation module 740, a memory module 742, a storage control module 744, a drop packet module 746, a time stamp generation module 748, a drop list generation module 752, a pass packet module 754, a history buffer maintenance module 756, and a DOS attack packet determination module 758. In some embodiments, the assembly of modules also includes a denial of service protection configuration module which is used to configure various aspects of the DOS packet attack protection device 500 or elements therein such as the processor 508.

Figure 10C:
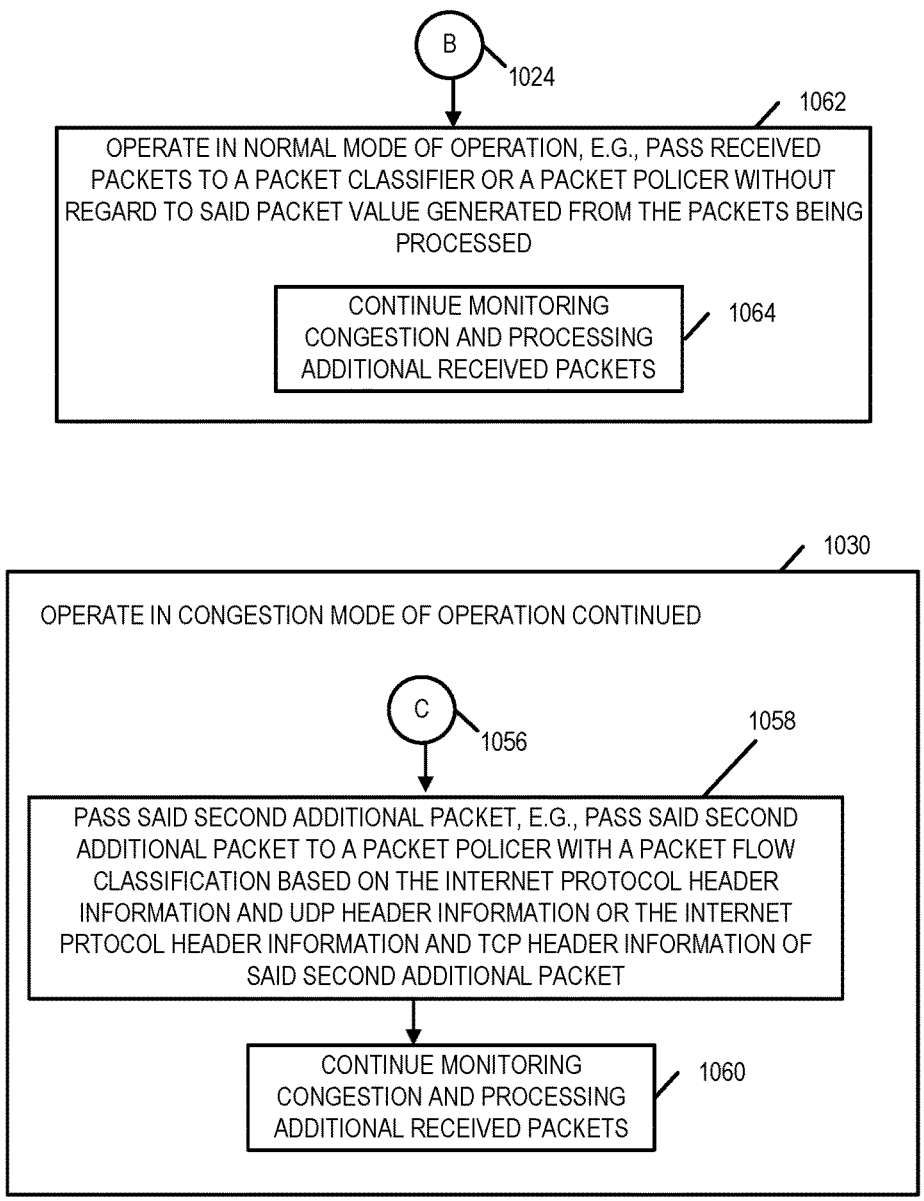
FIG. 10C is a third part of a flowchart of an exemplary communications method of detecting and deleting Denial of Service (DOS) attack packets in accordance with one embodiment of the present invention.

FIG. 10, comprising the combination of FIG. 10A, FIG. 10B and FIG. 10C, is a flowchart 1000 of an exemplary communications method of processing packets received at packet processing system 400 of FIG. 4 and stored in memory stage 1 packet processing queue for stage 1 packet processing module 1, in accordance with an exemplary embodiment. Processor 408 of the packet processing system, processor 508 of the DOS packet attack detection device or one or more modules of the assembly of modules 410, 414, 510, or 514 performs the steps of the method of flowchart 1000.

Operation starts in step 1002 and proceeds to step 1004 where a plurality of packets are received at a first device, e.g., a DOS packet attack protection device 418, an exemplary embodiment of which is shown and described in FIG. 5 via communications interface 504 receiver 550. Operation proceeds from receive step 1004 to step 1006. In step 1006, the packet value generation module generates at said first device, for each received packet of the plurality of received packets, a packet value from packet header information included in the received packet to which the generated value corresponds, the generated packet value being a hash value or CRC value. If hash values are used then hash values will be used throughout all steps of the method. If the CRC values are used than CRC values will be used throughout all steps of the method 1000. When hash values are used hash generation module 738 performs this generate packet value operation. When CRC values are used the CRC generation module 740 performs this generate packet value operation. By using a hash or CRC function to generate the packet value (e.g., packet hash value or packet CRC value), the packet value will include fewer bits than the packet header information from which it is generated. While there is a chance that two packets that are from different sources will have the same packet value the probability of such a conflict is extremely low as is the risk of misidentifying such packets as attack packets. Additionally, by using the hash or CRC values with fewer bits than the header information from which they were generated a greater processing and storage efficiency is achieved as fewer bits need to be stored and compared as part of the denial of service packet attack detection method. The processing speed and efficiency advantages achieved by the use of the packet hash or CRC value outweigh the low risk of misidentification of packets as attack packets by using the hash or CRC values. This low risk is further mitigated by the fact that any such misidentified packets would also be affected and potentially dropped should the cause of the congestion not be abated.

In the exemplary method 1000, the packet header information used to generate the packet values, i.e., packet hash value or packet CRC values consists of: a source address number, a source port number, a destination address number, a destination port number, a VLAN identification number, and a protocol identification number contained in the packet's header for which the packet value is being generated. This operation may be, and in some embodiments is implemented in dedicated hardware. In some embodiments, this packet value is generated by the packet processing system 400 packet value generation module 636 which is a collection of dedicated hardware circuits that generate either a packet hash value or a packet CRC value. In some embodiments whether a packet hash value is generated and used in the method 1000 or a packet CRC value is generated and used in the method 1000 is configurable.

In some embodiments, the packet header information used to generate the packet value includes at least three of the following: an IP source address number, a source port number, an IP destination address number, a destination port number, a VLAN identification number, and a protocol identification number.

In some embodiments said packet header information used to generate said packet value includes: a source address number, a source port number, a destination address number, a destination port number, a VLAN identification number, and a protocol identification number.

Operation proceeds from step 1006 to step 1008. In step 1008 storage control module 744 stores in memory, for each packet of the plurality of received packets, the generated packet value corresponding to the packet and a time, e.g., the time the packet was received (e.g., a time stamp or when the packet was received). In some embodiments the packet time stamp generation module 748 is used to generate the time stamp of when the packet was received. In the exemplary embodiment, the generated packet values and associated times are stored in memory 512 of DOS packet attack protection device 500 in data/information section 516 in a buffer, e.g. history buffer. In some embodiments, the generated packet values and associated times are stored in memory 412 section 416 data/information of packet processing system 400 which is accessible to the DOS packet attack protection device 500 via communication interface 504 and communications bus 411.

In some embodiments the memory for storing packet values and corresponding information is a buffer, e.g., history buffer that includes storage for less than 70 packet values and corresponding information.

In some embodiments the memory for storing packet values and corresponding information is a buffer that includes storage for less than 40 packet values and corresponding information.

In some embodiments, the memory for storing packet values and corresponding information is a buffer that includes storage for less than 20 packet values and corresponding information.

Operation proceeds from storage step 1008 to monitor congestion step 1010. In step 1010, congestion monitoring module 702 monitors congestion in the packet processing, e.g., in the packet processing of system 400, to detect a level of packet processing congestion. For example, the congestion monitoring module 702 may, and in some embodiments, does monitor the depth of the input queue to the first device and the depth of the input packet queue to one or more devices downstream from the first device to detect a level of packet processing congestion. For example, with reference to FIG. 3, the DOS protection device for stage 1core 1 monitors the depth that is the number of packets stored in the memory stage 1 packet processing queue 204, i.e., the total number of packets stored in each of the logical queues 302, 304, 306, and 308 that make up queue 204 and the depth that is the number of stored packets in the memory stage 2 packet processing queue for stage 2 . In some embodiments, the logical depths of the individual queues may be monitored such as for example, the depth of logical queue 302 to monitor for congestion.

Operation then proceeds from step 1010 to step 1012 which includes exemplary sub-steps 1014, 1016, and 1018. In step 1012 control module 732 determines whether to operate in a normal mode of operation or a congested mode of operation. In some embodiments, control module 632 of packet processing system 400 performs this step. In sub-step 1014 control module 732 determines whether the monitoring for congestion indicates a level of packet processing congestion over a first threshold. If monitoring does indicate a level of packet processing congestion over a first threshold operation proceeds to determination sub-step 1016 which determines that the first device, e.g., DOS packet attack protection device/module 418 exemplified in DOS packet attack protection device 500 is to operate in congested mode of operation. For illustrative purposes assume that stage 1 packet processing queue has a maximum queue depth of 8000 entries, the first threshold queue depth is 7600 entries or more than 95% of the queue being filled and the monitored queue depth was determined to 7601 packets. This would indicate a level of packet processing congestion over a first threshold. If the monitored queue depth was 7600 or less than the monitoring would not indicate a level of packet processing congestion over the first threshold which is the queue depth 7600 for stage 1 packet processing queue.

If in sub-step 1014 the monitoring does not indicate a level of packet processing congestion over a first threshold then operation proceeds to determination sub-step 1018. In determination sub-step 1018, the control module 732 determines that the first device is to operate in normal mode of operation.

Operation proceeds from sub-step 1018 to step 1020. In step 1020, control module 732 checks if the first device is operating in congested mode of operation and if it is switches the first device from the congested mode of operation to the normal mode of operation. If the first device is in the normal mode of operation the control module 732 allows it to remain in the normal mode of operation. In some embodiments, control module 632 of packet processing system 400 performs this operation. Operation proceeds from step 1020 via connection node B 1024 to step 1062 shown in FIG. 10C.

In step 1062 the first device, e.g., DOS protection device/module 500 operates in normal mode of operation, e.g., it passes received packets to modules and/or devices downstream in the processing chain from the first device such as to the stage 1 packet processing core 1 module 1 612 without regard to the packet value generated from the packets being processed. The stage 1 packet processing module 1 612 may, and in some embodiments does, include a stage 1 packet processing core 1 which is a packet classifier or a packet policer. In the normal mode of operation the first device, e.g., the DOS attack protection device 500, does not check the packet value of the packets it is receiving as no packet processing congestion has been detected, for example at the first or second stage of packet processing and therefore no DOS attack has been detected.

In sub-step 1064 operate in normal mode step 1062, the first device continues to monitor for congestion as discussed in connection with step 1010 and to process additional received packets. If the monitoring detects congestion operation would proceed to step 1012 with the processing of the next packet received at the first device, DOS attack protection device 500.

Returning now to sub-step 1016. Operation proceeds from sub-step 1016 to step 1026 shown on FIG. 10B via connection node A 1022. In step 1026, control module 732 checks if the first device, the DOS attack protection device 500 is operating in the normal mode of operation and if it is switches the first device from the normal mode of operation to the congested mode of operation. If the first device is in the congested mode of operation the control module 732 allows it to remain in the congested mode of operation. In some embodiments, control module 632 of packet processing system 400 performs this operation. Operation proceeds from step 1026 to step 1028. In step 1028, the control module 732 or in some embodiments the control module 632 of packet processing system 400 performs this step. The control module controls the first device such as by configuring it to operate in the congested mode of operation when the monitoring indicates a level of packet processing congestion over a first threshold. Operation proceeds from step 1028 to step 1030. In some embodiments the control module 732 switches the first device from the normal mode of operation to said congestion mode of operation in response to said monitoring detecting a level of congestion over a threshold such as the first threshold which may be, and in some embodiments is, the depth of the stage 1 packet processing queue for the stage 1 packet processing module 1 is over a certain depth threshold limit such as if it had 7600 packets in the aforementioned queue.

In step 1030, the first device, the DOS attack protection device operates in the congested mode of operation wherein it drops received packets based on the packet values generated from the packets to be dropped matching at least one previously generated packet value stored in memory, i.e., history buffer memory. Sub-steps 1032, 1034, 1036, 1038, 1040, 1042, 1044, 1046, 1048, 1050, 1052, 1054, 1058 and 1060 of step 1030 provides operations that are performed by the first device while operating in the congested mode of operation. In step 1032, receive at the first device, e.g., the DOS packet attack protection device via communications interface 504 receiver 550 and/or communications interface receive module 704 a first additional packet while operating in the congested mode of operation. The first additional packet receive time is, in some embodiments, generated by the time stamp generation module 748. In some embodiments the receive time is generated in a separate step. Operation then proceeds to sub-step 1034. In step 1034 a packet value, i.e., a packet hash value or a packet CRC value, corresponding to the first additional received packet is generated from the first additional received packet's header information at the first device. The packet value is generated in the same methods previously described. Both the packet value and associated received time stamp value are sometimes stored in memory 512 section 516 for use in later processing steps by the storage control module. This is true for all data, information and values generated or received by the DOS attack protection device/module 418 and 500.

In the exemplary embodiment, the packet value generation module 736 performs the packet value generation function of step 1034. In some embodiments, the packet value is not generated at the first device but is generated in the packet processing system 400 for example by packet value generation module 636. In some embodiments, the packet value is generated when the packet is received by the packet processing system 400 and is stored in memory 412 data/information section 416 with an association in memory that it corresponds to the received packet. In some of such cases the packet value is then not generated by the first device, e.g., DOS packet attack protection device/module 500 but is instead retrieved from memory by the first device, DOS packet attack protection device/module 500 by storage control module 744. Operation proceeds from sub-step 1034 to sub-step 1036.

In sub-step 1036, attack packet determination module 758 determines if the packet value corresponding to the first additional received packet is stored more than a threshold number of times in the memory 512, e.g., history buffer memory, stored in data/information section 516, during the pre-determined time interval. Operation proceeds from sub-step 1036 to sub-steps 1038 and 1044.

In sub-step 1044, the packet drop list generation module 752 adds the packet value corresponding to the first additional received packet to a packet drop list when it is determined that the packet value corresponding to the first additional received packet is included more than the threshold number of times in memory, e.g., the history buffer memory stored in memory 512 section 516 data/information during a pre-determined time interval. The threshold number of times is threshold discussed in step 1036. In some embodiments the threshold number of times and the pre-determined time interval are configurable and/or programmable. In some embodiments the threshold number of times and the pre-determined time interval are configurable and or programmable in real time. The packet drop list is stored by the storage control module 744 in memory 512 section 516 data/information. In some embodiments, the packet drop list is maintained in a circular queue in memory. The size, that is the number of packet values and associate information that are included in the drop list may be, and in some embodiments is configurable. One factor in determining the size of the drop list is the processing speed of the DOS protection device. As the size of the drop list affects the speed with which the DOS attack packet can process packets it is receiving the drop list size is typically kept short such for example a drop list of 4 or less packet values and associated information. This reduces the number of comparisons that need to be made of the received packet value with the packet values on the drop list increasing in many instances the efficiency and speed of DOS protection device. In some embodiments the drop list maybe and is of size 1 that is just a single packet value and associated information. In some embodiments, the use of a short drop list such as for example a drop list of size 2 provides increased processing efficiency as only the most recent received and identified attack packets will be on the list which are the most likely to be relevant to a DOS fat packet flow attack. In some embodiments when the drop list is implemented as a circular queue wherein the newer packets automatically overwrite the older identified DOS attack packet values when the newly identified packet values are added to the list.

In sub-step 1038, the drop packet module drops the first additional received packet when it is determined that the packet value corresponding to the first additional packet is stored more than the threshold number of times in memory, e.g., memory 512 section 516 during the pre-determined time interval. Operation proceeds from step 1038 to receive step 1040.

In step 1040, receive at the first device, e.g., the DOS packet attack protection device via communications interface 504 receiver 550 and/or communications interface receive module 704 a second additional packet while operating in the congested mode of operation. The processing that occurs in receive step 1040 is same as described above in connection with step 1032. The second additional packet receive time is, in some embodiments, generated by the time stamp generation module 748. In some embodiments the receive time is generated in a separate step. Operation then proceeds to sub-step 1042 which is similar to step 1034 described above. In step 1042 a second packet value, i.e., a packet hash value or a packet CRC value, corresponding to the second additional received packet is generated from the second additional received packet's header information at the first device. The second packet value is generated in the same methods previously described. Both the second packet value and associated received second additional packet time stamp value are sometimes stored in memory 512 section 516 for use in later processing steps by the storage control module.

Operation proceeds from step 1042 to decision step 1046. In decision step 1046 a decision is made as to whether the second packet value is on the drop list. If the second packet value is on the drop list operation proceeds to step 1048. If the second packet value is not on the drop list then operation proceeds to step 1052.

In step 1052, the DOS attack packet determination module 758 checks if the second packet value appears more than the aforementioned threshold number of times in the memory 512, e.g., history buffer memory stored in 516 section. If the second packet does appear more than a threshold number of times in the memory then second additional packet is determined to be a DOS attack packet and operation proceeds to steps 1048 and 1054. In some embodiments in addition to the second packet value appearing more than said threshold number of times in the memory a further requirement and check is made that the appearances must occur during a pre-determined time interval before the second additional received packet is determined to be a DOS attack packet in step 1052. If the packet does not appear more than the threshold number of times in the memory then the second additional packet is determined not to be an attack packet and processing proceeds via connection node C 1056 to sub-step 1058 shown in FIG. 10C. In some embodiments the additional check is made that the appearances were not during a predetermined time period if the number of appearance were over the threshold. That is the second additional received packet was determined not to be a DOS attack packet because the second packet value did not appear more than a threshold number of times in memory during a predetermined time period.

In step 1048, drop packet module 746 drops, e.g., deletes or discards, the second additional packet from the processing queue and does not allow it to pass on to modules or devices downstream from the first device such as the stage 1 packet processing module 1. Operation proceeds from step 1048 to step 1050.

Returning to step 1054, in step 1054 said drop list generation module 752 adds the second packet value which corresponds to the second additional received packet which has been determined to be a DOS attack packet to the drop packet list. In some embodiments the drop packet list contains only one packet value. In such embodiments instead of adding a packet value that has been determined to be a DOS attack packet to the drop packet list it just replaces the drop packet value in the list. In some embodiments, the drop packet list is stored in a memory such as for example a buffer of limited size, for example, size P where P is an integer number. In such embodiments when the buffer holding the dropped packet list is completely filled adding a new dropped packet value to the drop packet list results in the new drop packet value replacing one of the dropped packet values already on the list. In some embodiments, the drop packet value to be added replaces the oldest drop packet value on the drop packet list. In some embodiments the drop packet list is stored in a circular buffer. Operation proceeds from step 1054 to step 1050.

In step 1058, the pass packet module 754 passes the second additional packet that is it allows the second additional packet to be passed to devices downstream from the first device such as the stage 1 packet processing module 1 which may be, and in some embodiments is, a packet policer with a packet flow classification based on the Internet Protocol header information and UDP header information or the Internet Protocol header information and TCP header information of the second additional packet. In some embodiments the downstream device to which the second additional packet is passed is a packet policer with a packet flow classification based on the payload of the second additional packet. In some embodiments the downstream device to which the second additional packet is passed is a packet policer with a packet flow classification based on the content contained in various header levels of the second additional packet. Operation proceeds from step 1058 to step 1060.

In steps 1050 and steps 1060, the first device continues monitoring for packet processing congestion and continues processing additional packets in the same manner described above in connection with the second additional received packet. If the congestion monitoring module 702 detects a level of change in the packet processing congestion of packet processing system 400 that the congestion is now below the first threshold then the control module 732 will cause the first device, e.g., DOS attack protection device/module to switch to normal mode of operation. In the exemplary embodiment when the DOS attack protection device/module switches to a normal mode of operation from a congested mode of operation, the packet drop list maintenance module 730 clears the drop packet list.

Figure 9:
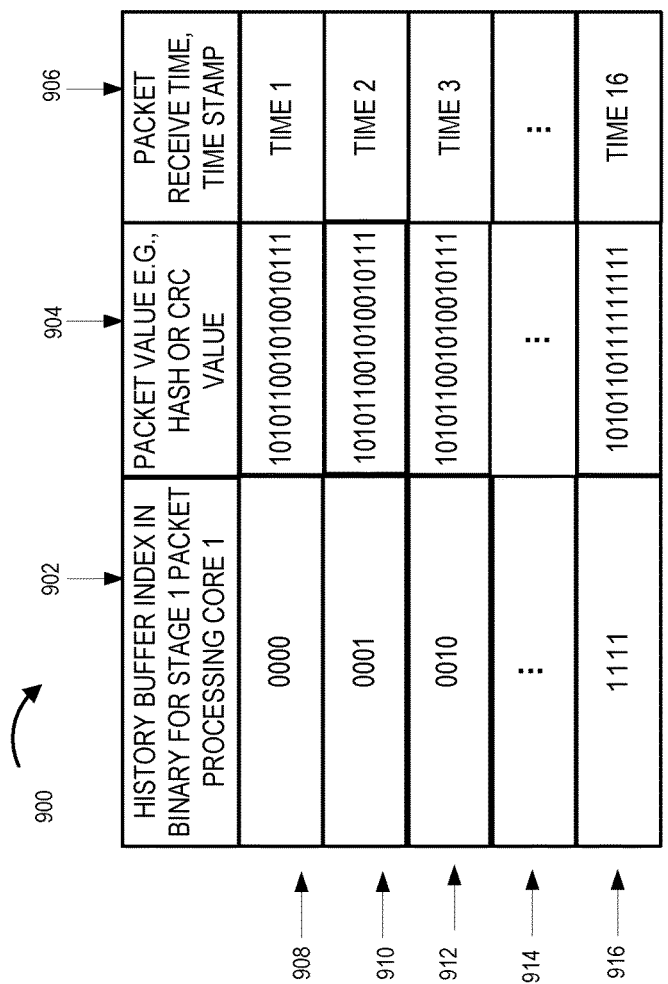
FIG. 9 illustrates an exemplary packet value history buffer in accordance with an exemplary embodiment of the present invention.

FIG. 9 shows an exemplary table 900 which is a circular history buffer array with storage for 16 entries, i.e., the circular buffer's has a maximum capacity or depth to store up to 16 entries of received packets' packet values and associated packet receive times. In this exemplary embodiment, the 16 entries store the packet values and associated receive times for the last 16 packets processed by the DOS packet protection device. Note that the first three packets have packet values that are all the same.

Each of the entries in rows 908, 910, 912, 914, . . . , 916 contain information associating the history buffer packet entries of column 902 with that entry's packet value, e.g., generated packet hash or CRC in column 904 and the packet's receive time, e.g., generated time stamp shown in column 906. In table entry row 908, column 902 is the value 0000 which is the binary index in the history buffer it associates the packet value 101011001010010111 (entry for row 908, column 904) with its packet receive time TIME 1. In table entry row 910 the history buffer index value of 0001 (entry row 910, column 902) is associated with packet value 101011001010010111 (entry row 910, column 904) and its associated packet receive time of TIME 2 (entry row 910, column 906). In table entry row 912 the history buffer index value of 0010 (entry row 912, column 902) is associated with packet value 101011001010010111 (entry row 912, column 904) and its associated packet receive time of TIME 3 (entry row 912, column 906). In table entry row 914 ". . . " have been entered to indicate that the rows of the table and associated data for those rows have not been shown. This information was not shown so as to simplify the drawing as it is only for illustrative purposes and is not necessary to explain the history buffer. In table entry row 916 the history buffer index value of 1111 (entry row 916, column 902) is associated with packet value 1010110111111111 (entry row 916, column 904) and its associated packet receive time of TIME 16 (entry row 916, column 906).

Additional exemplary communications apparatus are now explained in connection with FIGS. 4, 5, 6, and 7. One exemplary communications apparatus includes a receiver, a packet value generation module, a storage control module, a memory, a congestion monitoring module, a control module. In some embodiments the storage control module, congestion monitoring module and control module are included in a denial of service protection device or module, e.g., 418, 500, 634. In some embodiments the communications apparatus is an integrated circuit device.

In one embodiment of the exemplary apparatus the receiver is configured to receive a plurality of packets (e.g., 704, 550, 604, 420). The packet value generation module (e.g., 736, 738, 740, 636, 638, 640) is configured to generate for each received packet of the plurality of received packets, a packet value from packet header information included in the received packet to which the generated value corresponds, the generated packet value being a hash value or CRC value. The storage control module e.g., 744, 644, is configured to store in the memory, e.g., 512, 742, 412, 642, for each of plurality of received packets, the generated packet value corresponding to the packet and a time. In some embodiments the time is the time the packet is received by communications apparatus. In some embodiments, the communications apparatus includes a time stamp generation module 748, 648 that is configured to generate the time stamp to be stored when each of the plurality of packets is received. In some embodiments the memory in which the packet values and times are stored is a history buffer, e.g., a circular history buffer in memory, e.g., 514, 515. An exemplary history buffer 900 is shown in FIG. 9.

The exemplary congestion monitoring module e.g., 702, 602 is configured to determine the level of packet processing congestion being experienced by the communications apparatus or other apparatus which the communications apparatus is monitoring such as for example device downstream for the communications apparatus.

The control module e.g., 732, 632 is configured to control a denial of service protection device or module (e.g., 500, 418, 634) to switch between operating in a normal mode of operation or a congestion mode of operation based on the level of packet processing congestion determined by the congestion monitoring module, wherein operating in said normal mode of operation includes passing received packets to a packet classifier or a packet policer without regard to said packet value generated from the packets being passed and wherein operating in said congestion mode of operation is performed when said monitoring indicates a level of packet processing congestion over a first threshold, said operating in said congestion mode of operation including dropping received packets based on the packet value generated from the packets to be dropped matching at least one previously generated packet value stored in memory, and said control module controlling said denial of service protection device to operate in said normal mode of operation when it is not operating in said congestion mode of operation.

In some embodiments a drop packet module e.g., 746, 646, is configured to drop received packets that have been identified as DOS attack packets based on the packet value generated from the packets to be dropped matching at least one but typically several previously generated packet value stored in memory for example the history buffer memory previously discussed. In some embodiments, a pass packet module e.g., 754, 654 is configured to pass or allow packets to continue to downstream modules or devices either internal or external to the communications apparatus.

In some embodiments, the packet header information used to generate the packet value includes at least three of the following: an IP source address number, a source port number, an IP destination address number, a destination port number, a VLAN identification number, and a protocol identification number. In some embodiments, the packet header information used to generate the packet value includes: a source address number, a source port number, a destination address number, a destination port number, a VLAN identification number, and a protocol identification number. In some embodiments the packet header information used to generate said packet value consists of: a source address number, a source port number, a destination address number, a destination port number, a VLAN identification number, and a protocol identification number. In the exemplary communications apparatus the packet value generation module is configured to generate packet values which are hash value or a CRC values that include fewer bits than the packet header information from which the packet value is generated.

In some embodiments of the communications apparatus the memory for storing packet values and corresponding information is a buffer, e.g., a history buffer e.g., 900 that includes storage for less than 70 packet values and corresponding information. In some embodiments of the communications apparatus the memory for storing packet values and corresponding information is a buffer, e.g., a history buffer, e.g., 900, that includes storage for less than 40 packet values and corresponding information. In some embodiments of the communications apparatus the memory for storing packet values and corresponding information is a buffer, e.g., a history buffer, e.g., 900, that includes storage for less than 20 packet values and corresponding information.

In some embodiments the aforementioned control module of the communications apparatus is configured to switch said denial of service protection module from said normal mode of operation to said congestion mode of operation in response to said monitoring detecting a level of congestion over a threshold. In some embodiments of this exemplary communications apparatus the congestion threshold is based upon a depth of the input packet queue to either the denial of service protection device/module and/or one or more downstream devices. In some embodiments, the threshold is the depth of the input packet queue to either the denial of service protection module or one or more downstream devices. In some embodiments, the threshold also referred to as congestion threshold and packet processing congestion threshold is a data flow rate of packets over a predetermined limit. In some embodiments, the predetermined limit is a function of the packet processing speed of a device or module downstream from the denial of service protection device, e.g., the packet processing speed of a stage 1 packet processing module (e.g. 612). In some embodiments, the device or module downstream from the denial of service module is a packet classifier. In some embodiments, the predetermined limit is a function of the packet processing speed of one or more devices or modules downstream from the denial of service protection module wherein in some of such embodiments the one or more devices or modules downstream from the denial of service protection module includes a packet classifier. In addition some of such embodiments further include a packet processor downstream from the packet classifier.

In some embodiments of the exemplary communications apparatus, the control module is configured to control the denial of service device or module, while operating in the congestion mode of operation, to perform the steps of: receiving a first additional packet; generating a packet value corresponding to the first additional received packet; determining if the packet value corresponding to the first additional received packet is stored more than a threshold number of times in said memory during a pre-determined time interval; and dropping the first additional received packet when it is determined that the packet value corresponding to the first additional received packet is stored more than the threshold, e.g., a DOS packet attack threshold, number of times, e.g., 3 times. Some of these are performed by modules within the denial of service device or module, e.g., the assembly of modules 700.

In some embodiments, the exemplary apparatus also includes a packet drop list maintenance module configured to add the packet value corresponding to the first additional received packet to a packet drop list when it is determined that said packet value corresponding to the first additional received packet is included more than said threshold number of times in said memory wherein the threshold number of times is an attack threshold, e.g., DOS packet attack threshold indicating the number of times the packet must appear in the history buffer for example during a predetermined period of time. The DOS packet attack threshold also referred to as the attack threshold is a number greater than the largest number of packets expected in a well-behaved flow within the exclusion time. The DOS packet attack threshold is a value that takes into account the size of the history buffer, the predetermined period of time and allowable packet flow sizes. In some embodiments the attack threshold number is configurable and/or programmable and is configured based on the size of the history buffer and/or the size of the input queue into the DOS packet protection device and/or the size of the input queue to the first processing module or device downstream from the DOS packet protection module. In some embodiments the attack threshold number is reduced as the amount of packet processing congestion increases.

In some of such embodiments, the attack threshold number is a value greater than 20. In some of such embodiments, the attack threshold number is a value greater than 10. In some of such embodiments the attack threshold number is a value greater than 5. In some of such embodiments the attack threshold number is the number 3. In some of such embodiments when the attack threshold number is the number 3, the history buffer size if 16 packet values and the predetermined time during which the packet values must have been received is 3 microseconds. FIG. 9 illustrates an exemplary history buffer populated with three entries of packet values that are the same, i.e., 101011001010010111. If a received packet value is the same as those three entries, i.e., it is 101011001010010111, then the received packet will be identified as a DOS attack packet if the time of the receive packet is within 3 microseconds of the received times TIME 1, TIME 2 and TIME 3 stored in the history buffer memory and associated with the matching packet values.

In some embodiments, the exemplary apparatus' control module is further configured to control the denial of service protection device to, while operating in said congestion mode of operation, receive a second additional packet; generate a second packet value corresponding to the second additional packet; drop said second additional packet if said second packet value is on said drop list; check, if said second packet value is not on said drop list, if said second packet value appears more than said threshold number of times in said memory; drop said second additional packet if said second packet value appears more than said threshold number of times in said memory; and otherwise pass said packet. In some of the previously discussed embodiments of the apparatus that include a packet drop list maintenance module, the packet drop list maintenance module is further configured to add the second packet value to said drop list when said second packet value is not on said drop list and appears more than said threshold number of times in said memory. In some embodiments the second packet value is added to the drop when it does not appear in the drop list and when it appears more than said threshold number of time in said memory during a predetermined interval of time.

In some embodiments of the exemplary apparatus passing said packet includes passing said packet to a packet policer with a packet flow classification based on the payload of said second additional packet. In some of such embodiments the packet policer applies a bandwidth constraint to a flow to which said second additional packet corresponds but which does not block the flow entirely.

In some embodiments of the apparatus the packet drop list maintenance module is further configured to: maintain packet values added to said drop list on said drop list until a switch from the congestion mode of operation to said normal mode of operation.

In some embodiments of the apparatus, the time corresponding to a packet value stored in said memory is the time at which the packet corresponding to the packet value being stored was received by said denial of service protection module.

In some embodiments of the apparatus, a history buffer maintenance module, e.g., 656, 756 is configured to delete packet values from said memory which are more than a predetermined amount of time from a current time. In some of such embodiments, the predetermined amount of time is less than 50 microseconds. In some of such embodiments, the predetermined amount of time is less than 20 microseconds. In some of such embodiments, the predetermined amount of time is less than 15 microseconds. In some of such embodiments, the predetermined amount of time is less than 10 microseconds. In some of such embodiments, the predetermined amount of time is less than 5 microseconds. In some of such embodiments, the predetermined amount of time is about 3 microseconds.

In some embodiments of the apparatus the drop list maintenance module is further configured to delete the packet values in said drop list in response to a change from said congestion mode of operation to said normal mode of operation.

In some embodiments the congestion monitoring module is included in said denial of service protection module and is configured to determine a level of packet processing congestion at said denial of service protection module or is located at a packet policer downstream of said denial of service protection module and is configured to determine a level of packet processing congestion at said packet policer.

The communications system 400 includes an output buffer queue module 650 configured to place packets which have been received and processed by the communications system 400 and are ready for transmission into an output buffer queue which resides in memory 416. From this output buffer queue the processed packets are outputted from the communications system 400 for example by second communications interface transmitter module 610 configured to transmit packets in the output buffer queue to the second communication link, e.g., a network link 2, via the second communications interface 406 transmitter 426 of I/O Interfaces 402.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a data processing system. Various embodiments are also directed to methods, e.g., a method of processing data. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

In various embodiments, servers, e.g., application servers, may be utilized. Servers may be implemented in one or more circuits thus in some embodiments a server is a hardware device. In some embodiments servers may be software. In some embodiments servers may be a combination of hardware and software.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A semiconductor chip comprising:
receiver circuitry that receives a plurality of packets;
a plurality of packet processing cores;
packet value generation circuitry that generates for each received packet of the plurality of received packets, a packet value from packet header information included in the received packet to which the generated value corresponds, said generated packet value having fewer bits than said packet header information from which it is generated, said generated packet value being a hash value or CRC value generated from packet header information that uniquely identifies a packet flow and a source of the packet flow to which the packet belongs;
time stamp generation circuitry that generates for each received packet of the plurality of received packets, a time value corresponding to the time the packet was received by the receiver circuitry;
a memory for storing the generated packet values and generated time values corresponding to each received packet of the plurality of received packets;
congestion monitoring circuitry that determines a level of packet processing congestion;
a processor configured to control denial of service protection circuitry to switch between operating in a normal mode of operation or a congestion mode of operation based on the level of packet processing congestion determined by said congestion monitoring circuitry, wherein operating in said normal mode of operation includes passing received packets to a first packet processing core of the plurality of packet processing cores without regard to said packet value generated from the packets being passed and wherein operating in said congestion mode of operation is performed when said monitoring indicates a level of packet processing congestion over a threshold, said operating in said congestion mode of operation including dropping received packets based on both: (i) the packet value generated from the packets to be dropped matching at least one previously generated packet value stored in said memory and (ii) the packets to be dropped generated received time value, said processor controlling said denial of service protection circuitry to operate in said normal mode of operation when it is not operating in said congestion mode of operation; and
wherein the threshold is based upon a depth of an input packet queue to the denial of service protection circuitry or a depth of an input packet queue to one or more of said plurality of packet processing cores, said plurality of packet processing cores being downstream from said denial of service protection circuitry.

2. The semiconductor chip of claim 1, wherein said processor is configured to switch said denial of service protection circuitry from said normal mode of operation to said congestion mode of operation in response to said monitoring circuitry detecting a level of congestion over the threshold.

3. The semiconductor chip of claim 2, wherein the first packet processing core performs packet policing or packet classification.

4. The semiconductor chip of claim 2, wherein the threshold is a data flow rate of packets over a predetermined limit.

5. The semiconductor chip of claim 4, wherein the predetermined limit is a function of a packet processing speed of the first packet processing core.

6. The semiconductor chip of claim 5, wherein said processor is further configured to control the denial of service protection circuitry, while operating in the congestion mode of operation, to perform the steps of:
receiving a first additional packet;
determining if a packet value corresponding to the first additional received packet is stored more than a threshold number of times in said memory during a predetermined time interval; and
dropping the first additional received packet when it is determined that the packet value corresponding to the first additional received packet is stored more than said threshold number of times in said memory during the predetermined time interval.

7. The semiconductor chip of claim 6, further comprising:
packet drop list maintenance circuitry that adds the packet value corresponding to the first additional received packet to a packet drop list when it is determined that said packet value corresponding to the first additional received packet is included more than said threshold number of times in said memory within said predetermined time interval.

8. The semiconductor chip of claim 7, wherein said processor is further configured to control the denial of service protection circuitry, while operating in said congestion mode of operation, to:
receive a second additional packet;
drop said second additional packet if a packet value corresponding to the second additional packet is on said drop list;
check, if said packet value corresponding to the second additional packet is not on said drop list, if said packet value corresponding to the second additional packet appears more than said threshold number of times in said memory during said predetermined time interval;
drop said second additional packet if said packet value corresponding to the second additional packet appears more than said threshold number of times in said memory during said predetermined time interval; and
otherwise pass said second additional packet.

9. The semiconductor chip of claim 8, wherein passing said second additional packet includes passing said second additional packet to a packet policer with a packet flow classification based on Internet Protocol and UDP header information or Internet Protocol and TCP header information of said second additional packet.

10. The semiconductor chip of claim 9, wherein the packet policer applies a bandwidth constraint to a flow to which said second additional packet corresponds but which does not block the flow entirely.

11. The semiconductor chip of claim 8, wherein passing the second additional packet includes passing the second additional packet to a packet policer with a packet flow classification based on the payload of said second additional packet.

12. The semiconductor chip of claim 8, further comprising:
history buffer maintenance circuitry that deletes packet values from said memory which have corresponding time values which are more than a predetermined amount of time from a current time.

13. The semiconductor chip of claim 12, wherein said drop list maintenance circuitry deletes the packet values in said drop list in response to a change from said congestion mode of operation to said normal mode of operation.

14. The semiconductor chip of claim 1, further comprising memory access control circuitry that stores said packet values and said time values in said memory in a circular buffer.

15. The semiconductor chip of claim 1, wherein said congestion monitoring circuitry is included in said denial of service protection circuitry and determines a level of packet processing congestion at the denial of service protection circuitry or is included in a packet policer downstream of said denial of service protection circuitry and determines a level of packet processing congestion at the packet policer.

16. A session border controller device comprising:
receiver circuitry that receives a plurality of packets;
a plurality of packet processing cores;
packet value generation circuitry that generates for each received packet of the plurality of received packets, a packet value from packet header information included in the received packet to which the generated value corresponds, said generated packet value having fewer bits than said packet header information from which it is generated, said generated packet value being a hash value or CRC value generated from packet header information that uniquely identifies a packet flow and a source of the packet flow to which the packet belongs;
time stamp generation circuitry that generates for each received packet of the plurality of received packets, a time value corresponding to the time the packet was received by the receiver circuitry;
a memory for storing the generated packet values and generated time values corresponding to each received packet of the plurality of received packets;
congestion monitoring circuitry that determines a level of packet processing congestion;
a processor configured to control denial of service protection circuitry to switch between operating in a normal mode of operation or a congestion mode of operation based on the level of packet processing congestion determined by said congestion monitoring circuitry, wherein operating in said normal mode of operation includes passing received packets to a first packet processing core of the plurality of packet processing cores without regard to said packet value generated from the packets being passed and wherein operating in said congestion mode of operation is performed when said monitoring indicates a level of packet processing congestion over a threshold, said operating in said congestion mode of operation including dropping received packets based on both: (i) the packet value generated from the packets to be dropped matching at least one previously generated packet value stored in said memory and (ii) the packets to be dropped generated received time value, said processor controlling said denial of service protection circuitry to operate in said normal mode of operation when it is not operating in said congestion mode of operation; and
wherein the threshold is based upon a depth of an input packet queue to the denial of service protection circuitry or a depth of an input packet queue to one or more of said plurality of packet processing cores, said plurality of packet processing cores being downstream from said denial of service protection circuitry.

17. The Session Border Controller of claim 16, wherein the first packet processing core performs packet policing or packet classification.

18. The Session Border Controller of claim 16, wherein the threshold is a data flow rate of packets over a predetermined limit.

19. A method of operating a semiconductor chip comprising:
receiving a plurality of packets at receiver circuitry of the semiconductor chip;
generating by the semiconductor chip for each received packet of the plurality of received packets, a packet value from packet header information included in the received packet to which the generated value corresponds, said generated packet value having fewer bits than said packet header information from which it is generated, said generated packet value being a hash value or CRC value generated from packet header information that uniquely identifies a packet flow and a source of the packet flow to which the packet belongs;
generating, by time stamp generation circuitry of the semiconductor chip, for each received packet of the plurality of received packets, a time value corresponding to the time the packet was received by the receiver circuitry;
storing in memory the generated packet values and generated time values corresponding to each received packet of the plurality of received packets;
determining by the semiconductor chip a level of packet processing congestion;
operating the semiconductor chip in a normal mode of operation or a congestion mode of operation based on the level of packet processing congestion determined by said semiconductor chip, wherein operating in said normal mode of operation includes passing received packets to a first packet processing core of the plurality of packet processing cores without regard to said packet value generated from the packets being passed and wherein operating in said congestion mode of operation is performed when said monitoring indicates a level of packet processing congestion over a threshold, said operating in said congestion mode of operation including dropping received packets based on both: (i) the packet value generated from the packets to be dropped matching at least one previously generated packet value stored in said memory and (ii) the packets to be dropped generated received time value, said processor controlling said denial of service protection circuitry to operate in said normal mode of operation when it is not operating in said congestion mode of operation; and
wherein the threshold is based upon a depth of an input packet queue to the denial of service protection circuitry or a depth of an input packet queue to one or more of said plurality of packet processing cores, said plurality of packet processing cores being downstream from said denial of service protection circuitry.

20. The method of claim 19, wherein the first packet processing core performs packet policing or packet classification.

* * * * *